United States Patent
Sasaki et al.

(10) Patent No.: US 11,905,134 B2
(45) Date of Patent: Feb. 20, 2024

(54) RECORDING APPARATUS WITH MOTOR THAT DRIVES MULTIPLE TRANSPORT ROLLERS

(71) Applicant: SEIKO EPSON CORPORATION, Tokyo (JP)

(72) Inventors: Keisuke Sasaki, Matsumoto (JP); Shinji Kanemaru, Matsumoto (JP); Katsumi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 17/092,930

(22) Filed: Nov. 9, 2020

(65) Prior Publication Data

US 2021/0139260 A1 May 13, 2021

(30) Foreign Application Priority Data

Nov. 11, 2019 (JP) ................................. 2019-203777

(51) Int. Cl.
| | |
|---|---|
| *B65H 3/06* | (2006.01) |
| *B65H 5/06* | (2006.01) |
| *B41J 13/02* | (2006.01) |
| *B65H 5/36* | (2006.01) |
| *B65G 13/06* | (2006.01) |
| *B41J 23/02* | (2006.01) |

(52) U.S. Cl.
CPC ............ *B65H 3/0669* (2013.01); *B41J 13/02* (2013.01); *B41J 23/02* (2013.01); *B65G 13/06* (2013.01); *B65H 3/0676* (2013.01); *B65H 5/06* (2013.01); *B65H 5/36* (2013.01); *B65H 2403/70* (2013.01)

(58) Field of Classification Search
CPC ...... B65H 3/0669; B65H 3/0676; B65H 5/06; B65H 5/062; B65H 5/26; B65H 29/125; B65H 2403/70; B65H 2407/21; B41J 13/02; B41J 23/02; B41J 23/025
See application file for complete search history.

(56) References Cited

U.S. PATENT DOCUMENTS

| | | | |
|---|---|---|---|
| 8,201,817 B1* | 6/2012 | Boo ...................... | B65H 3/0684 271/10.13 |
| 8,746,690 B1* | 6/2014 | Rao ........................... | B41J 3/60 271/225 |
| 2009/0166963 A1* | 7/2009 | Fukasawa ............ | B41J 13/0027 271/264 |

(Continued)

FOREIGN PATENT DOCUMENTS

| | | |
|---|---|---|
| CN | 1055141 | 10/1991 |
| CN | 102649514 | 8/2012 |

(Continued)

*Primary Examiner* — Prasad V Gokhale
(74) *Attorney, Agent, or Firm* — WORKMAN NYDEGGER

(57) ABSTRACT

A recording apparatus includes a recording head that performs recording; a feeding roller that feeds out a medium that has been set, a transport roller that transports the medium fed out by the feeding roller toward a facing position facing the recording head; an auxiliary roller that is provided between the feeding roller and the transport roller and that assists in the transport of the medium; a motor that generates a driving force; and a drive train that is configured to transmit the driving force of the motor to the auxiliary roller and the transport roller.

14 Claims, 19 Drawing Sheets

(56) References Cited

U.S. PATENT DOCUMENTS

| | | | | |
|---|---|---|---|---|
| 2013/0043642 A1* | 2/2013 | Sakai | ................ | B41J 11/0095 |
| | | | | 271/265.01 |
| 2013/0256983 A1* | 10/2013 | Horade | ................ | B65H 3/0684 |
| | | | | 271/225 |
| 2014/0041998 A1 | 2/2014 | Minemura et al. | | |
| 2016/0236489 A1* | 8/2016 | Nakano | ................ | B65H 31/02 |
| 2020/0324559 A1 | 10/2020 | Sumii | | |

FOREIGN PATENT DOCUMENTS

| | | |
|---|---|---|
| JP | S64-022576 A | 1/1989 |
| JP | 2014-034452 A | 2/2014 |
| JP | 2014-094576 A | 5/2014 |
| JP | 2015-157681 A | 9/2015 |
| JP | 2016-150826 | 8/2016 |
| JP | 2018-193200 | 12/2018 |
| JP | 2020-007125 A | 1/2020 |
| JP | 2020-172360 A | 10/2020 |
| JP | 2020-175966 | 10/2020 |

* cited by examiner

RECORDING APPARATUS WITH MOTOR THAT DRIVES MULTIPLE TRANSPORT ROLLERS

The present application is based on, and claims priority from JP Application Serial Number 2019-203777, filed Nov. 11, 2019, the disclosure of which is hereby incorporated by reference herein in its entirety.

BACKGROUND

1. Technical Field

The present disclosure relates to a recording apparatus.

2. Related Art

To date, a recording apparatus having a plurality of driving rollers that contribute to transport of a medium has been used. For example, JP-A-64-22576 discloses a printer having a plurality of driving rollers such as paper feeding rollers and transport rollers for transporting a paper sheet S. The printer disclosed in JP-A-64-22576 has a stepping motor (not illustrated) for driving the paper feeding rollers and a motor (not illustrated) for driving the transport rollers.

In a recording apparatus having a plurality of driving rollers that contribute to the transport of a medium, it is desirable that the rotational speed relationship of the driving rollers be constant. This is because variations in the rotational speed of the driving rollers may cause an unexpected load such as unnecessary tension on a medium transported by the plurality of rollers, which may result in transport failure. However, in the existing recording apparatus having a plurality of driving rollers that contribute to the transport of a medium, such as the printer disclosed in JP-A-64-225766, since a plurality of motors drive the plurality of driving rollers, transport failure may occur. In particular, in a recording apparatus having an auxiliary roller that assists in the transport of the medium in order to suppress transport failure, if the rotational speed relationship between the auxiliary roller and other driving rollers varies, the effect of suppressing the transport failure will end up becoming smaller. Therefore, it is an object of the present disclosure to suppress variations in the rotational speed relationship of a plurality of driving rollers that contribute to the transport of a medium.

SUMMARY

According to an aspect of the present disclosure, a recording apparatus includes a recording head that performs recording, a feeding roller that feeds out a medium that has been set, a transport roller that transports the medium fed out by the feeding roller toward a facing position facing the recording head, an auxiliary roller that is provided between the feeding roller and the transport roller and that assists in the transport of the medium, a motor that generates driving force, and a drive train that is configured to transmit the driving force of the motor to the auxiliary roller and the transport roller.

DESCRIPTION OF EXEMPLARY EMBODIMENTS

Figure 1:
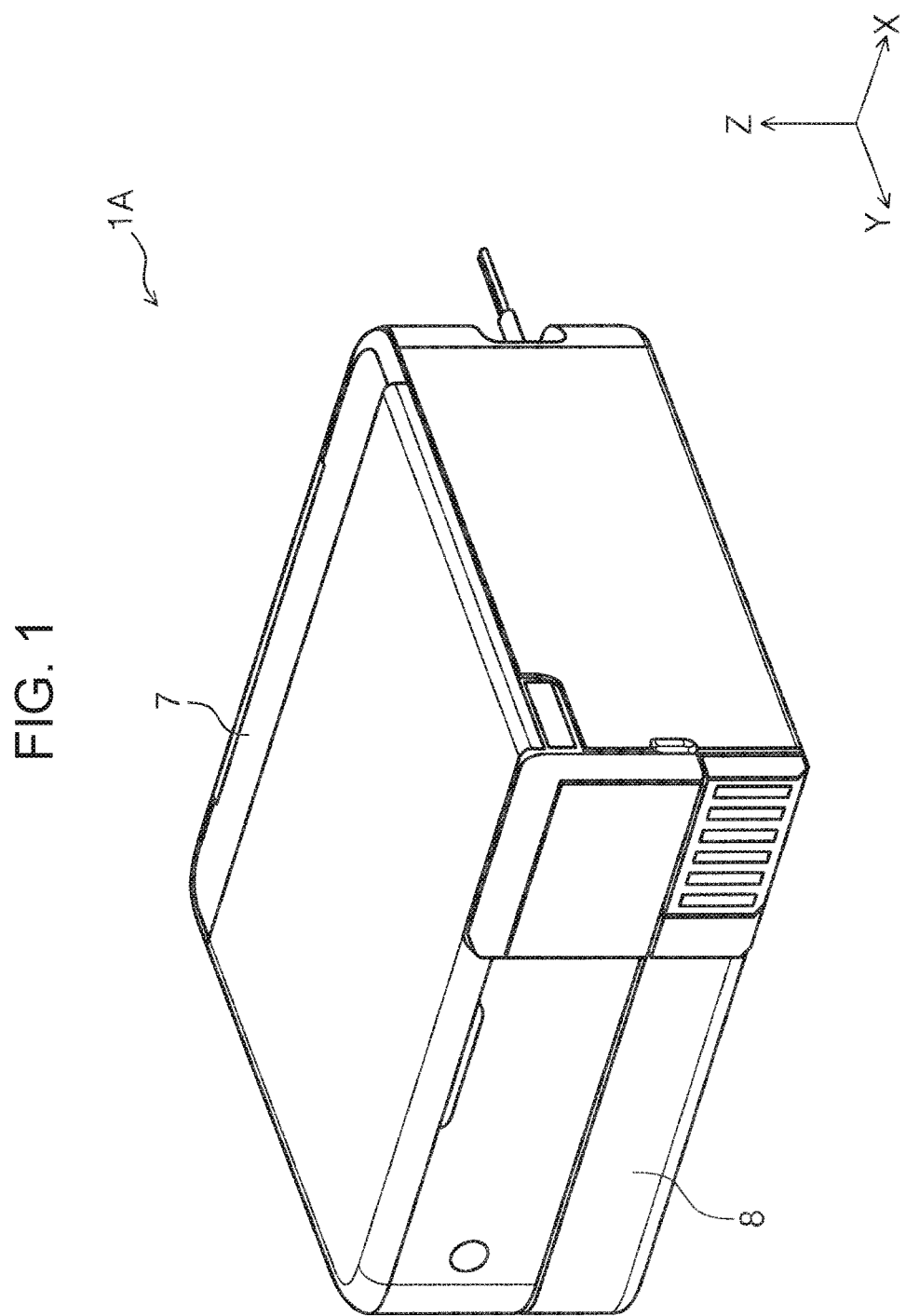
FIG. 1 is a perspective view of a recording apparatus according to a first embodiment of the present disclosure.

At first, the present disclosure will be schematically described.

According to a first aspect of the present disclosure, a recording apparatus includes a recording head that performs recording, a feeding roller that feeds out a medium that has been set, a transport roller that transports the medium fed out by the feeding roller toward a facing position facing the recording head, an auxiliary roller that is provided between the feeding roller and the transport roller and that assists in the transport of the medium, a motor that generates driving force, and a drive train that is configured to transmit the driving force of the motor to the auxiliary roller and the transport roller.

According to this aspect, the auxiliary roller and the transport roller are driven by a common motor. Therefore, it is possible to suppress variations in the rotational speed relationship of the auxiliary roller and the transport roller caused by the use of different motors, and it is possible to effectively suppress transport failure. In addition, by reducing the number of motors, the apparatus can be reduced in size and the cost can be reduced.

According to a second aspect of the present disclosure, a recording apparatus includes a recording head that performs recording, a feeding roller that feeds out a medium that has been set, a transport roller that transports the medium fed out by the feeding roller toward a facing position facing the recording head, a discharging roller that discharges the medium that has been recorded on by the recording head at the facing position, an auxiliary roller that is provided between the feeding roller and the transport roller and that assists in the transport of the medium, a motor that generates driving force, and a drive train that is configured to transmit the driving force of the motor to the auxiliary roller and the discharging roller.

According to this aspect, the auxiliary roller and the discharging roller are driven by the common motor. Therefore, it is possible to suppress variations in the rotational speed relationship of the auxiliary roller and the discharging roller caused by the use of different motors, and it is possible to effectively suppress transport failure. In addition, by reducing the number of motors, the apparatus can be reduced in size and the cost can be reduced.

In a third aspect according to the second aspect, the drive train is configured to transmit the driving force of the motor to the transport roller, and the auxiliary roller, the transport roller and the discharging roller are driven by the motor via the drive train.

According to this aspect, because, in addition to the auxiliary roller and the discharging roller, the transport roller is also driven by the common motor, it is possible to particularly effectively suppress variations in the rotational speed relationship of the plurality of driving rollers that contribute to the transport of the medium, and it is possible to particularly effectively suppress transport failure.

In a fourth aspect according to any one of the first to third aspects, the drive train is configured to transmit the driving force of the motor to the feeding roller, and the feeding roller is driven by the motor via the drive train.

According to this aspect, since the auxiliary roller and the feeding roller are driven by the common motor, it is possible to particularly effectively suppress variations in the rotational speed relationship of the plurality of driving rollers that contribute to the transport of the medium, and it is possible to particularly effectively suppress transport failure.

In a fifth aspect according to any one of the first to fourth aspects, the recording apparatus further includes a feed tray configured to place the medium thereon, a medium housing portion configured to place the medium therein, and a front feeding roller that feeds out the medium from the medium housing portion toward the facing position facing the recording head, in which the feeding roller is a rear feeding roller that feeds out the medium from the feed tray toward the facing position facing the head, the drive train is configured to transmit the driving force of the motor to the front feeding roller, and the front feeding roller is driven by the motor via the drive train.

According to this aspect, since, in addition to being able to feed out the medium from a preferable side among the rear feeding roller side and the front feeding roller side in accordance with the type of medium used, the auxiliary roller and front feeding roller are driven by the common motor, it is possible to particularly effectively suppress transport failure.

In a sixth aspect according to any one of the first to fifth aspects, the recording apparatus further includes an inverting path that inverts the medium, and an inverting roller that is provided on the inverting path and that moves the medium by rotating in contact with the medium, in which the drive train is configured to transmit the driving force of the motor to the inverting roller, and the inverting roller is driven by the motor via the drive train.

According to this aspect, since, by having an inverting path that inverts the medium, it is possible to record on both sides of the medium, and, since, by driving the auxiliary roller and the inverting roller with the common motor, it is possible to particularly effectively suppress variations in the rotational speed relationship of the plurality of driving rollers that contribute to the transport of the medium, it is possible to particularly effectively suppress transport failure.

In a seventh aspect according to a sixth aspect, the drive train has a clutch that transmits rotational force in either a forward rotation direction or a reverse rotation direction regardless of whether a rotation shaft of the motor rotates in the forward rotation direction or the reverse rotation direction.

According to this aspect, the transport roller that requires rotation in the forward rotation direction and rotation in the reverse rotation direction, and the auxiliary roller and the inverting roller that need only have one of the forward rotation direction and the reverse rotation direction, can be coupled via a simple drive train with one dual one-way clutch. Therefore, the apparatus configuration can be simplified and the apparatus can be reduced in size and the cost can be reduced.

First Embodiment

A recording apparatus 1 according to an embodiment of the present disclosure will be described below with reference to the drawings. A recording apparatus 1A according to a first embodiment illustrated in FIGS. 1 to 16 is an ink jet printer that records on a medium by ejecting ink from a recording head 2 onto the medium. In the XYZ coordinate system illustrated in each drawing, the X-axis direction indicates an apparatus depth direction, the Y-axis direction indicates an apparatus width direction, and the Z-axis direction indicates an apparatus height direction. Here, as illustrated in FIG. 5, the X-axis direction corresponds to an axial direction of rotation shafts of various rollers such as a transport roller 3, the Y-axis direction corresponds to a medium discharge direction, and the Z-axis direction corresponds to a facing direction at a facing position P1 where the medium and the recording head 2 face each other.

Schematic Configuration of Recording Apparatus

First, a schematic configuration of the recording apparatus 1A will be described with reference to FIGS. 1 to 5. As illustrated in FIG. 5, the recording apparatus 1A includes a recording unit 5 that records on a medium and a reading unit 6 that can read an image of a document. However, the present disclosure is not limited to the configuration including the reading unit 6.

Figure 2:
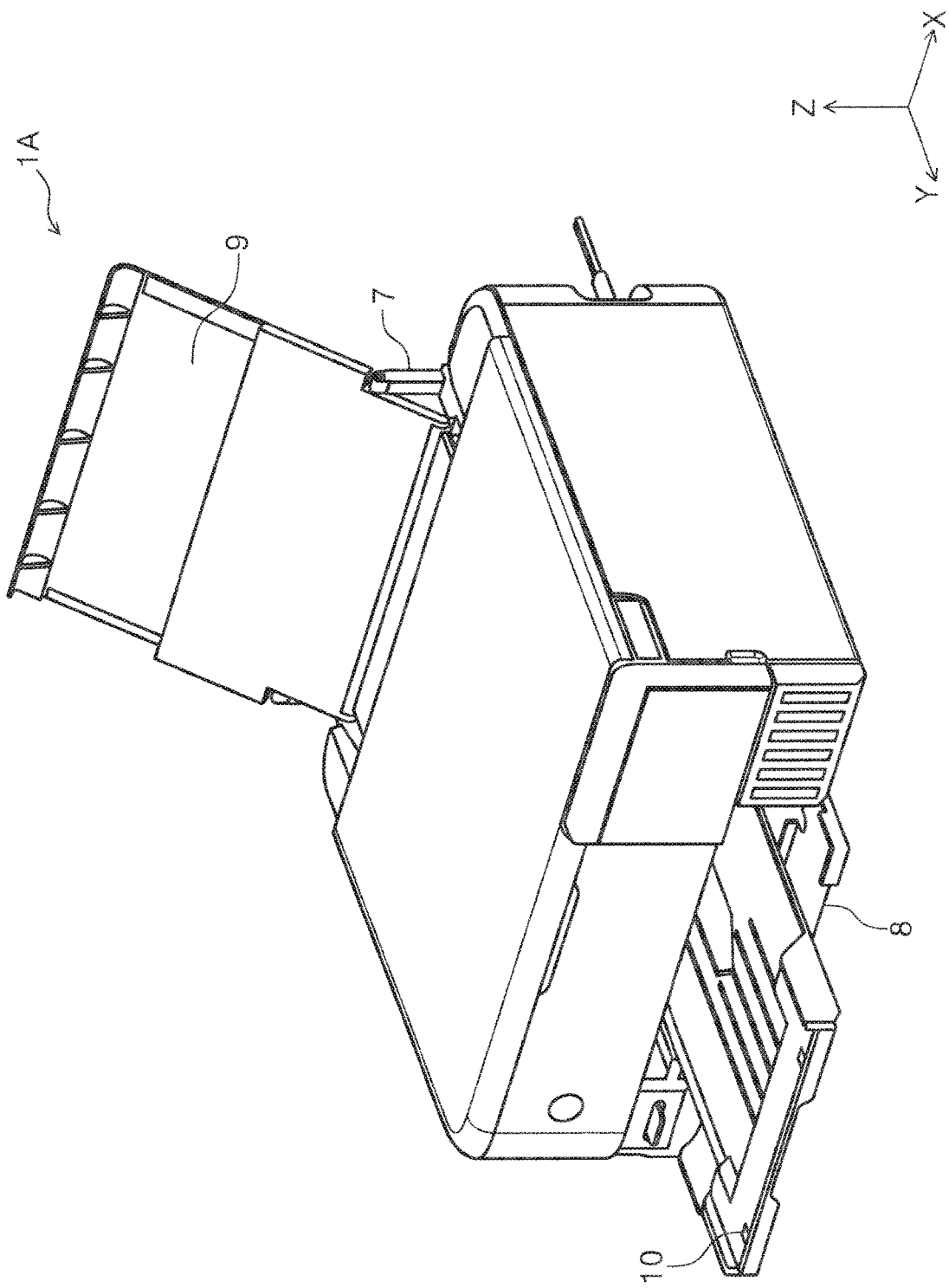
FIG. 2 is a perspective view of the recording apparatus according to the first embodiment of the present disclosure, illustrating a state when a rear-side auto sheet feeder is used.
Figure 3:
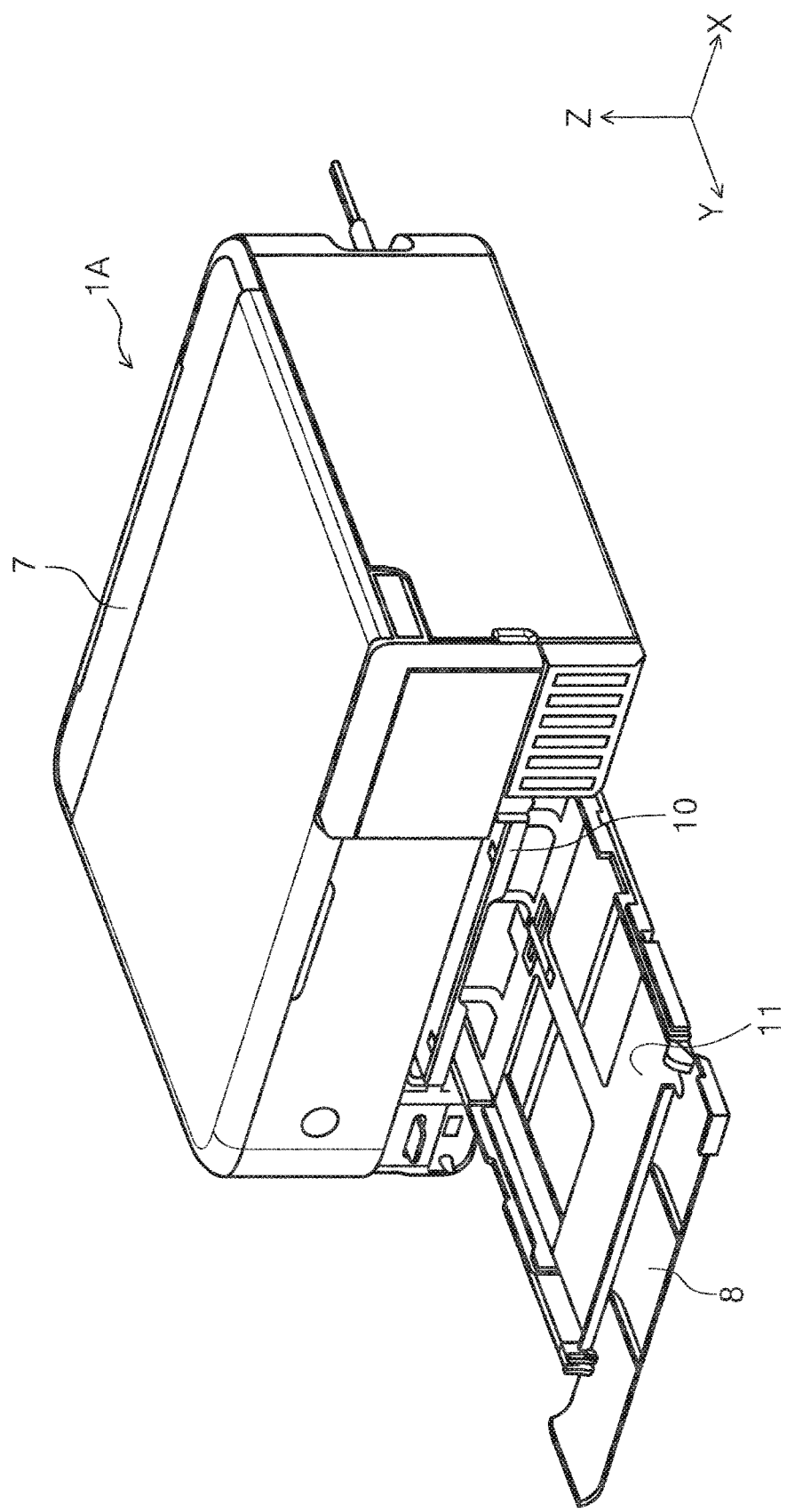
FIG. 3 is a perspective view of the recording apparatus according to the first embodiment of the present disclosure, illustrating a state in which a cassette is pulled out to a front side.

The recording apparatus 1A has a configuration in which recording can be performed on a medium set on a feed tray 9 by opening a rear cover 7 and a front cover 8 from the state illustrated in 1, and pulling out the feed tray 9 and a discharge tray 10 to the state illustrated in FIG. 2. In addition, as illustrated in FIG. 3, the front cover 8 is linked to a cassette 11 on which a medium is placed, and has a configuration in which, by pulling out the cassette 11 together with the front cover 8, a medium can be set in the cassette 11. That is, the recording apparatus 1A has a configuration in which recording can be performed on the medium set in the feed tray 9 and has a configuration in which recording can be performed on the medium set in the cassette 11.

When recording on the medium that has been set on the feed tray 9, the recording apparatus 1A feeds the medium to the transport roller 3 by rotating a feeding roller 12 once in a rotation direction C1, then, the medium is transported to the facing position P1 facing the recording head 2 by rotating the transport roller 3 in a rotation direction C2, and the recording medium is discharged to the discharge tray 10 by rotating the transport roller 3 in the rotation direction C2, and rotating a roller 14 and a discharging roller 15. As illustrated in FIG. 5, the transport path that serves as the feeding path for the medium via the feeding roller 12 forms the transport path R1, and the transport path for the medium via the transport roller 3 and the like forms the transport path R4. Further, a separation roller 13 is provided at a position facing the feeding roller 12 on the transport path R1, and when a plurality of media are set on the feed tray 9, the media are suppressed from being double-fed.

The feeding roller 12 of this embodiment has a D-shape when viewed from the X-axis direction as illustrated in FIG. 5, in other words, a portion of the circular arc surface of the cylinder has a planar shape; however, the present disclosure is not limited to such a configuration. For example, when viewed from the X-axis direction, the feeding roller 12 may have an O shape, in other words, it may have a cylindrical shape.

Here, a pair of rollers 18 including an auxiliary roller 16 rotatable in the rotation direction C1 and a driven roller 17 provided at a position facing the auxiliary roller 16 are provided between the feeding roller 12 and the transport roller 3 on the transport path R1. When the recording apparatus 1A transports the medium on the transport path R1, in other words, when the medium is at the nipping position between the pair of rollers 18, the recording apparatus 1A rotates the auxiliary roller 16 in the rotation direction C1 to assist in the transport of the medium. For this reason, the recording apparatus 1A can suppress transport failure of the medium on the transport path R1. Here, "assist in the transport of the medium" is not limited to assisting in the transport when the transport roller 3 transports the medium toward the facing position P1, and, for example, it is meant to include assisting in the feeding of the medium other than by using the transport roller 3, such as assisting in the feeding of the medium by using the feeding roller 12. That is, the term "transport" in this specification includes all operations of moving the medium, such as feeding by the feeding roller 12 and discharging by the roller 14 and the discharging roller 15.

When recording on a medium that has been set in the cassette 11, the recording apparatus 1A causes a pickup roller 21 of a pick unit 19 to rotate in the rotation direction C2 by rotating a pick unit rotary shaft 20, and the medium is fed out to the transport roller 3 by transporting the medium along the transport path R2 that serves as a feeding path. Then, after that, the medium is transported to the facing position P1 facing the recording head 2 by rotating the transport roller 3 in the rotation direction C2, and, after recording has been performed on the medium, the medium is discharged to the discharge tray 10 by rotating the transport roller 3 in the rotation direction C2 and rotating the roller 14 and the discharging roller 15.

After recording on one surface of the medium, the recording apparatus 1A can invert the medium by transporting the medium through a transport path R3 that serves as an inverting path and recording on the other surface of the medium before discharging the medium onto the discharge tray 10. Further, as illustrated in FIG. 5, the transport path R3 partially overlaps the transport path R2, and an inverting roller 22 and a plurality of driven rollers 23, 24, 25 and 26, which are provided at positions facing the inverting roller 22, are formed on this overlapping transport path.

Figure 4:
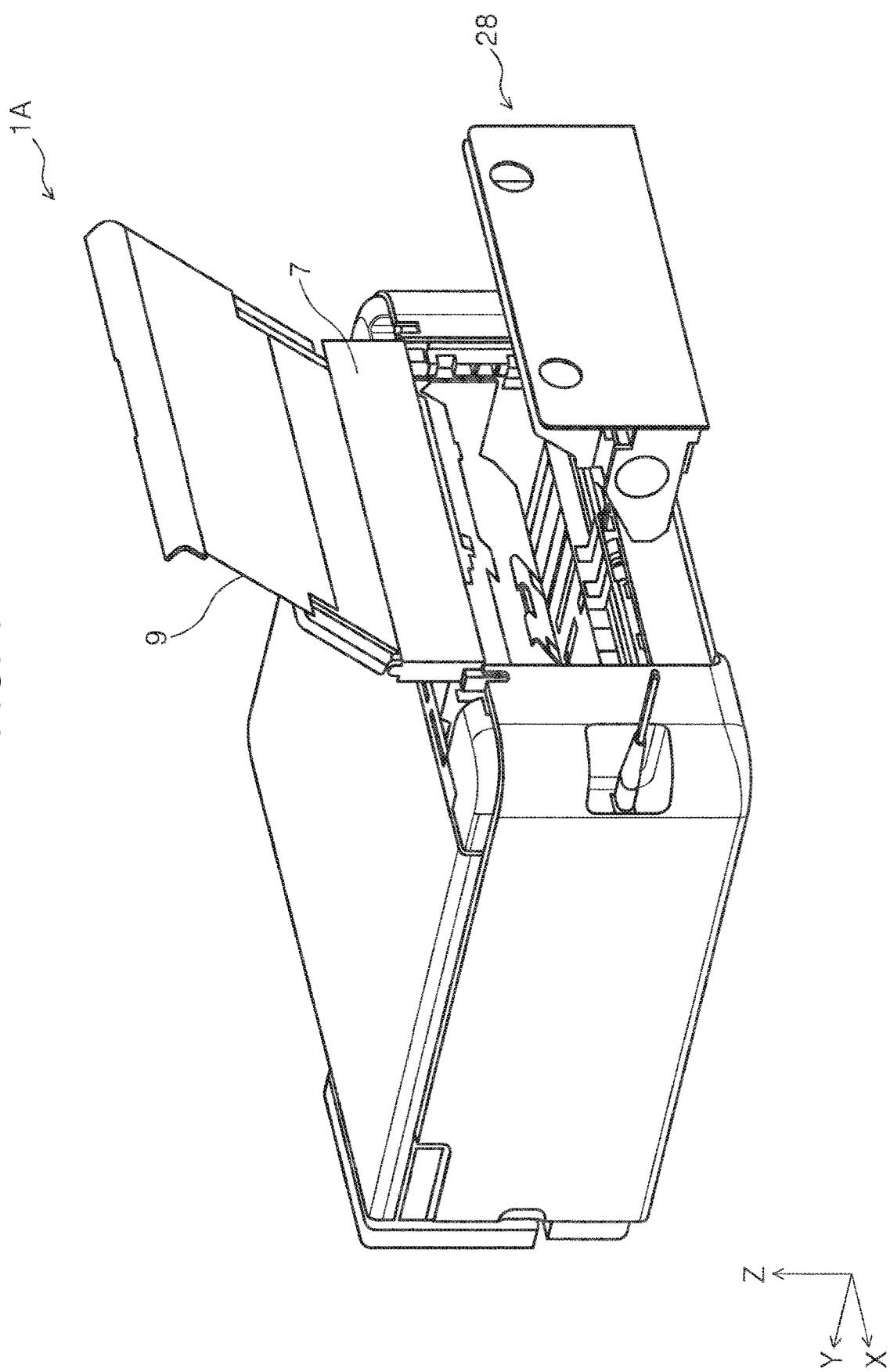
FIG. 4 is a perspective view of the recording apparatus according to the first embodiment of the present disclosure, illustrating a state in which an inversion unit is pulled out to a rear side.
Figure 5:
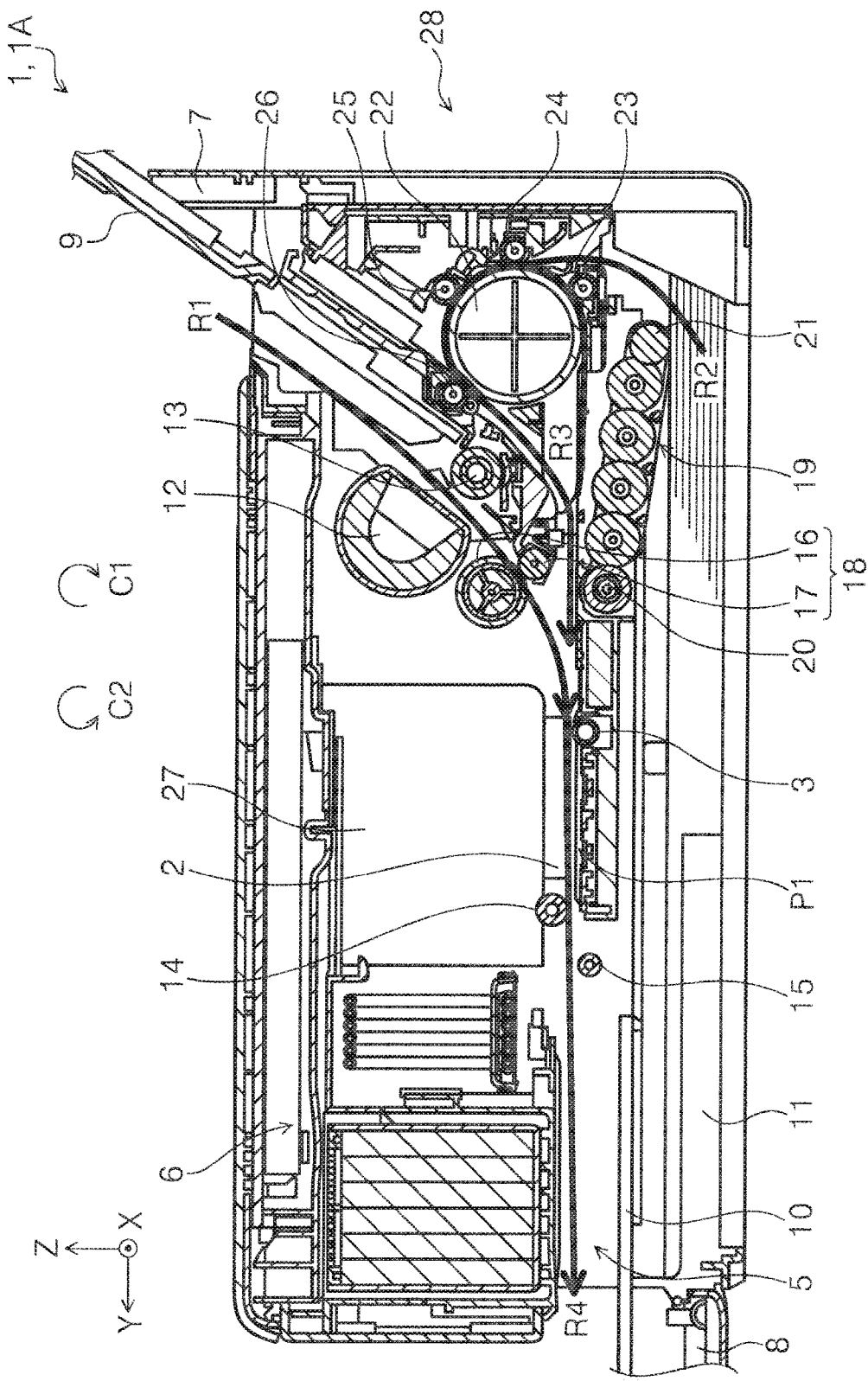
FIG. 5 is a side sectional view of the recording apparatus according to the first embodiment of the present disclosure.

Further, as illustrated in FIG. 4, an inversion unit 28, which forms the transport path R3 having the inverting roller 22 and the like, is detachable from the recording apparatus 1A. Instead of the inversion unit 28, it is possible to attach a unit having a transport path different from the inversion unit 28 to the recording apparatus 1A.

The recording head 2 of this embodiment is provided on a carriage 27 that is movable along the X-axis direction. The recording apparatus 1A is capable of forming an image by ejecting ink from the recording head 2 onto a transported medium while reciprocally moving the carriage 27 along the X-axis direction. By providing the carriage 27 having such a configuration, the recording apparatus 1A forms a desired image on the medium by repeatedly transporting the medium by a predetermined transport amount and ejecting ink while moving the carriage 27 along the X-axis direction while the medium is stopped.

Further, the recording apparatus 1A is a so-called serial printer that performs recording by alternately repeating transport of the medium by a predetermined amount and reciprocal movement of the carriage 27. However, the recording apparatus 1A may be a so-called line printer that uses a line head having nozzles formed in a line along the X-axis direction to continuously perform recording while transporting a medium.

As described above, the recording apparatus 1A has the recording head 2 that performs recording, the feeding roller 12 that feeds out a medium that has been set in the feed tray 9, the transport roller 3 that transports the medium fed by the feeding roller 12 toward the facing position P1 facing the recording head 2, the discharging roller 15 that discharges the medium recorded on by the recording head 2 at the facing position P1, and the auxiliary roller 16 that assists in the transport of the medium. In addition, as illustrated in FIG. 5, a transport path R3 as an inverting path for inverting the medium is provided on the opposite side to the recording head 2 with respect to the transport roller 3. The auxiliary roller 16 is illustrated in FIG. 5.

As illustrated in FIG. 5, the auxiliary roller 16 is provided at a position between the transport path R3 and the transport roller 3, which is a position between the feeding roller 12 and the transport roller 3. As in this example, by providing the auxiliary roller 16 between the feeding roller 12 and the transport roller 3 or between the transport path R3, which is an inverting path, and the transport roller 3, it is possible to effectively increase the accuracy of medium transport at a position where transport failure of the medium is likely to occur.

Further, the feeding speed of the medium by the feeding roller 12 alone, the feeding speed of the medium by the auxiliary roller 16 alone, the transport speed of the medium by the transport roller 3 alone, and the feeding speed of the medium by the discharging roller 15 alone decrease in the order of the feeding roller 12, the auxiliary roller 16, the transport roller 3, and the discharging roller 15. That is, the medium is transported so that tension is not applied to the medium inside the recording apparatus 1A.

Drive Mechanism of Driving Rollers

Next, a drive mechanism for each driving roller of the recording apparatus 1A will be described with reference to FIGS. 6 to 12. Here, in the present specification, "driving roller" refers to a roller that rotates when driving force of a motor is transmitted thereto via a drive train or the like. Further, in the recording apparatus 1A, driving force of a motor 30 is first transmitted to the transport roller 3 via a drive train 31, the transport roller 3 is rotated, and rotational force of the transport roller 3 is transferred to the auxiliary roller 16, the inverting roller 22, the feeding roller 12, and the pickup roller 21 via a drive train 32. In addition, as illustrated in FIG. 6, when the transport roller 3 rotates, rotational force of a gear 50 provided on the transport roller 3 is transmitted to a gear 52 provided on the discharging roller 15 via a belt 51, and the discharging roller 15 rotates.

Figure 6:
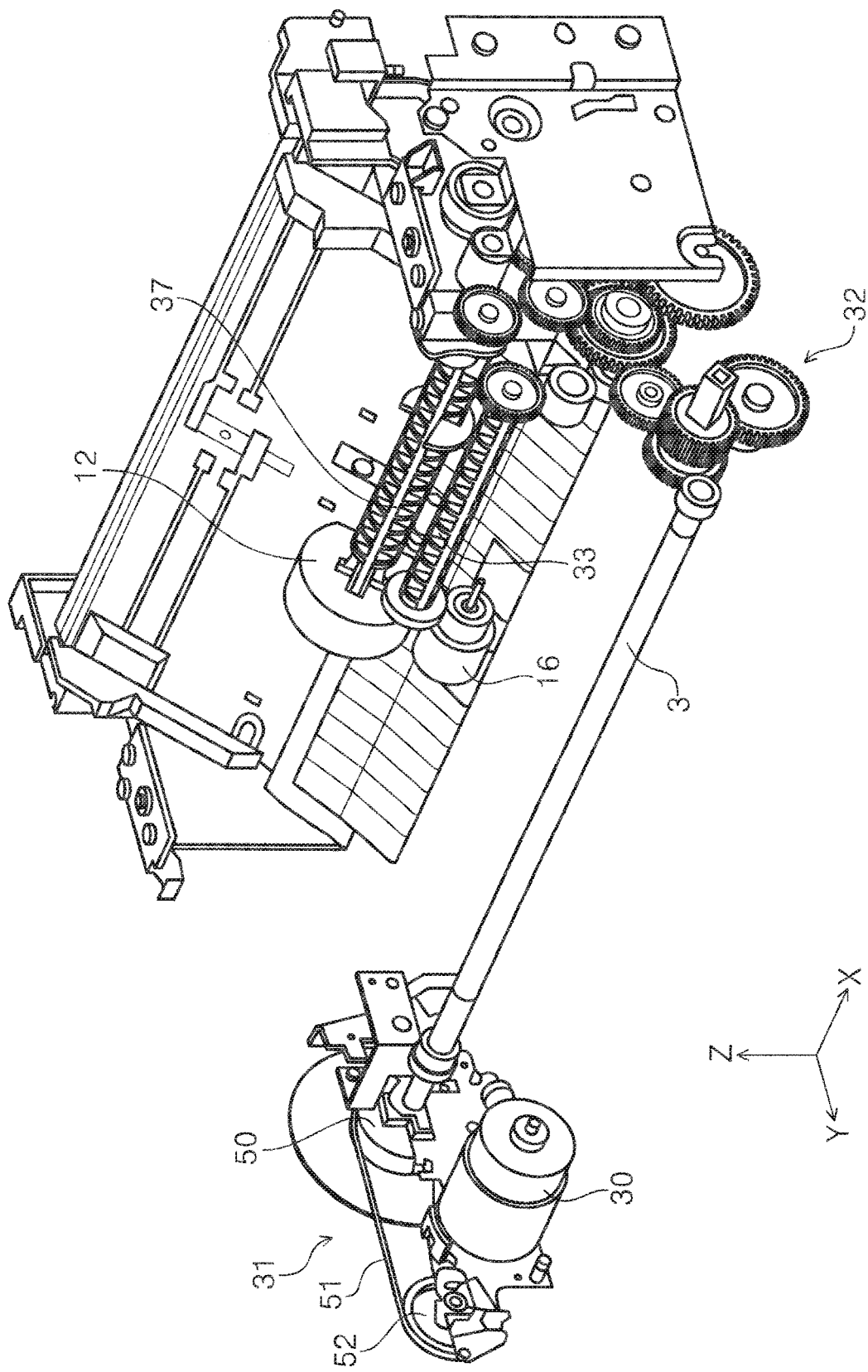
FIG. 6 is a perspective view illustrating an internal configuration of a motor and each drive train of the recording apparatus according to the first embodiment of the present disclosure.
Figure 12:
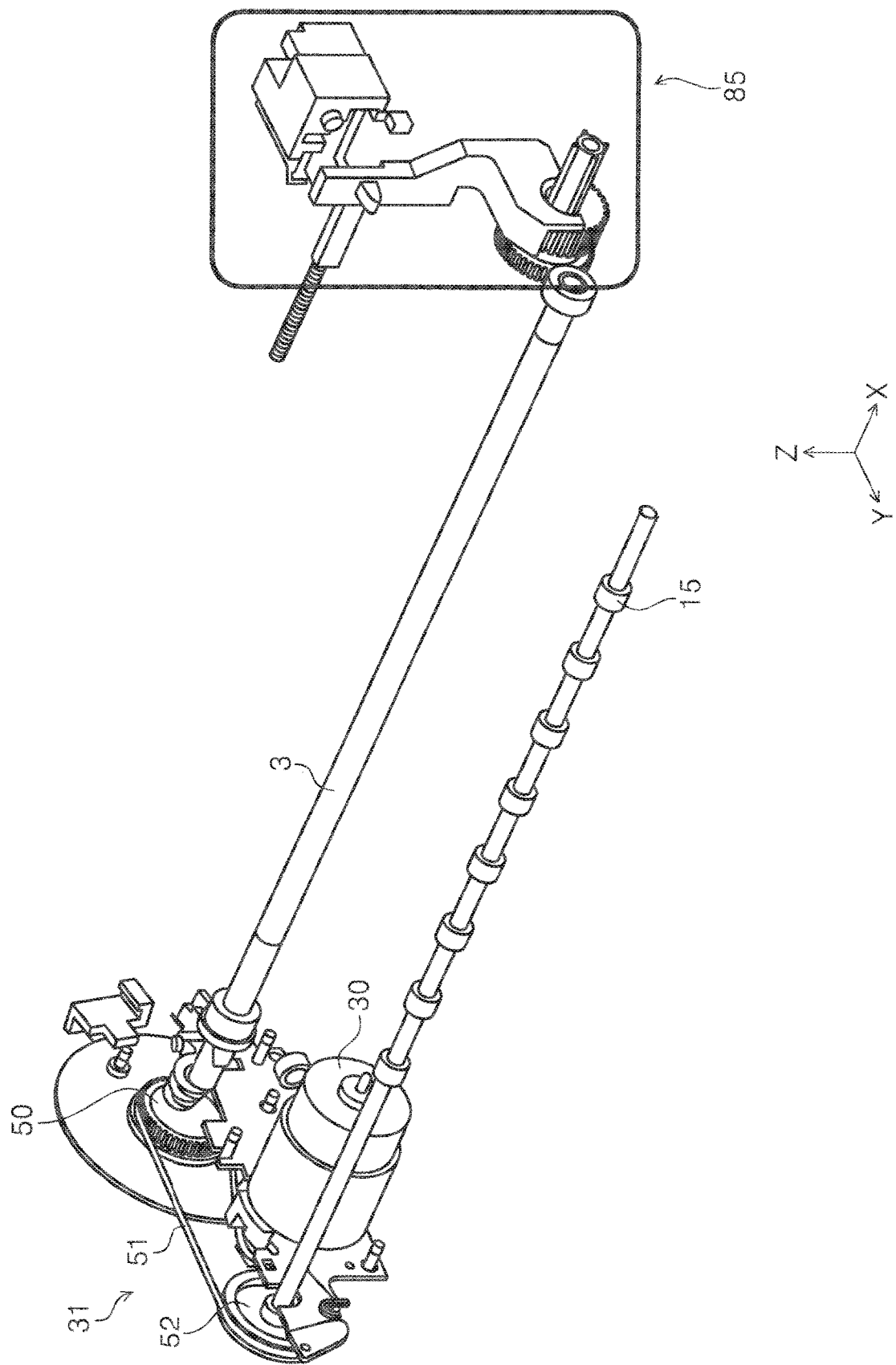
FIG. 12 is a perspective view illustrating the drive train from the transport roller to a discharging roller and a power switching mechanism of the recording apparatus according to the first embodiment of the present disclosure.

As illustrated in FIGS. 6 and 12, and the like, the recording apparatus 1A has the motor 30. A rotation shaft (not illustrated) of the motor 30 is coupled to the transport roller 3 via the drive train 31. The motor 30 can rotate the rotation shaft thereof in both forward and reverse rotations, and the transport roller 3 can also rotate in both forward and reverse rotations in accordance with the forward and reverse rotations of the rotation shaft of the motor 30. Further, "forward rotation" here corresponds to a rotation direction in which the medium is moved in a discharge direction, and "reverse rotation" corresponds to a rotation direction in which the medium is moved in an opposite direction to the discharge direction.

Figure 7:
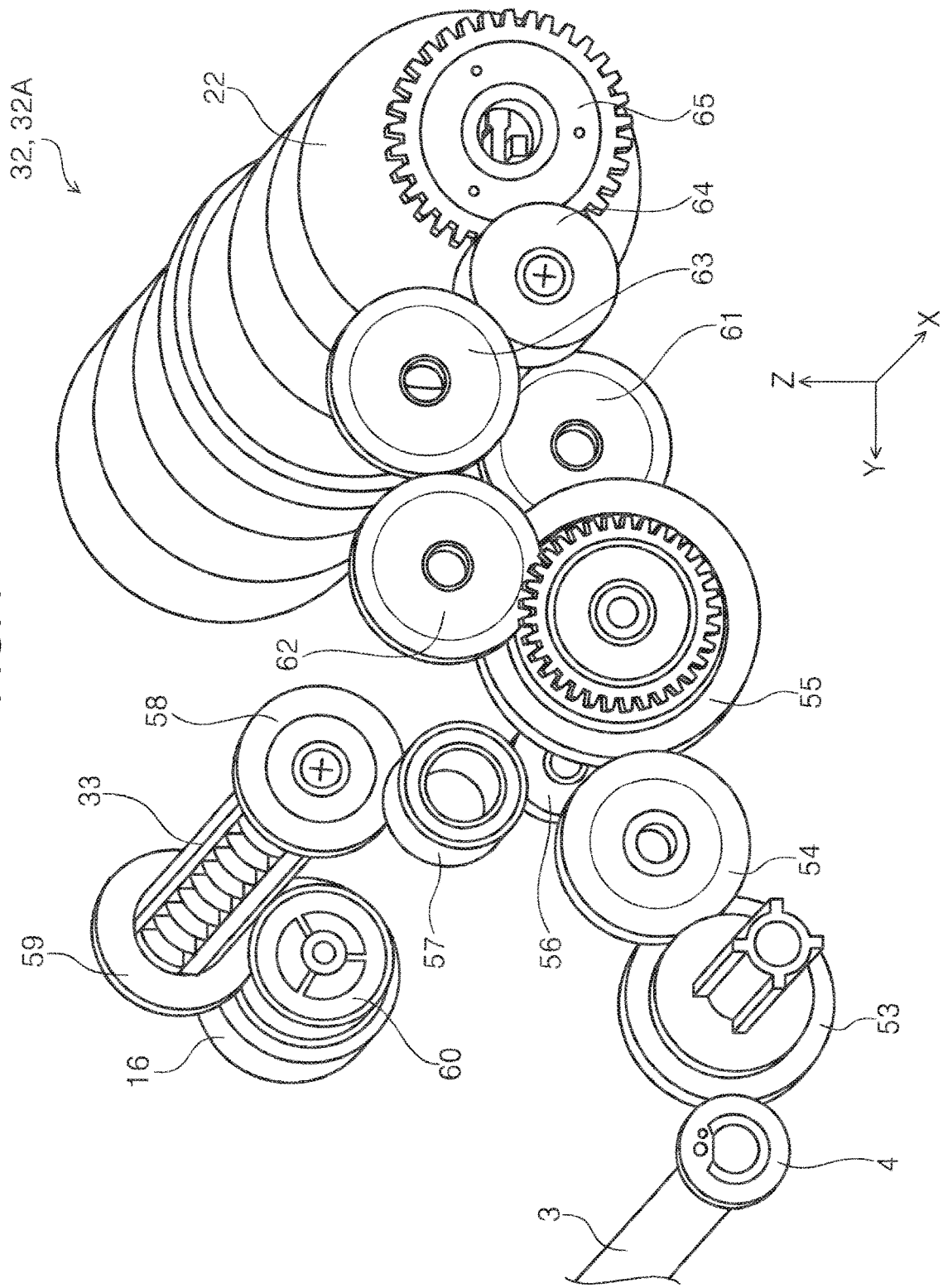
FIG. 7 is a perspective view illustrating a drive train from a transport roller to an auxiliary roller and an inverting roller of the recording apparatus according to the first embodiment of the present disclosure.

As illustrated in FIG. 6 and the like, the recording apparatus 1A has the drive train 32 on the opposite side to the drive train 31 in the X-axis direction. The drive train 32 is a drive train that transmits the rotational force of the transport roller 3 to the auxiliary roller 16, the inverting roller 22, the feeding roller 12, and the pickup roller 21. FIG. 7 illustrates a drive train 32A within the drive train 32 from the transport roller 3 to the auxiliary roller 16 and the inverting roller 22.

As illustrated in FIG. 7, the drive train 32A includes a gear 4 attached to the transport roller 3, a compound gear 53 that meshes with the gear 4, a gear 54 that meshes with the compound gear 53, and a dual one-way clutch 55 that meshes with the gear 54. Here, the dual one-way clutch 55, as represented by, for example, a one-way compound gear mechanism disclosed in JP-A-2014-34452, is a gear that rotates only in one rotation direction among the forward and reverse rotations regardless of whether the gear 54, which rotates in a forward or reverse direction upon forward rotation or reverse rotation of the transport roller 3, rotates with forward rotation or reverse rotation. Further, the dual one-way clutch transmits the rotational force to two paths, while the single one-way clutch transmits the rotational force to one path. The single one-way clutch is also a gear that rotates only in one direction among the forward and reverse rotations regardless of whether the gear that transmits the rotational force rotates with forward rotation or reverse rotation.

The drive train 32A has a gear 56 that meshes with the dual one-way clutch 55, a gear 57 that meshes with the gear 56, and a drive shaft 33 in which a gear 58 is provided on one side thereof in the X-axis direction and a gear 59 is provided on the other side thereof in the X-axis direction. The gear 58 meshes with the gear 57, and the gear 59 meshes with a gear 60 provided on the auxiliary roller 16. In addition, the drive train 32A has a gear 61 that meshes with the dual one-way clutch 55, a gear 62 that meshes with the gear 61, a gear 63 that meshes with the gear 62, a gear 64 that meshes with the gear 63, and a gear 65 that meshes with the gear 64. Further, the gear 65 is a gear provided on the inverting roller 22.

Since the recording apparatus 1A has the drive train 32A having such a configuration, the recording apparatus 1A has a configuration in which, the rotational force of the transport roller 3, which is caused to rotate by the motor 30, is transmitted to the auxiliary roller 16 and the inverting roller 22. As described above, since the drive train 32A has the dual one-way clutch 55, the auxiliary roller 16 and the inverting roller 22 rotate only with forward rotation which is one direction among forward and reverse rotations, regardless of whether the transport roller 3 rotates with forward or reverse rotation. Further, the forward rotation of the auxiliary roller 16 corresponds to the rotation direction C1 in FIG. 5, and the forward rotation of the inverting roller 22 corresponds to the rotation direction C2 in FIG. 5.

Figure 8:
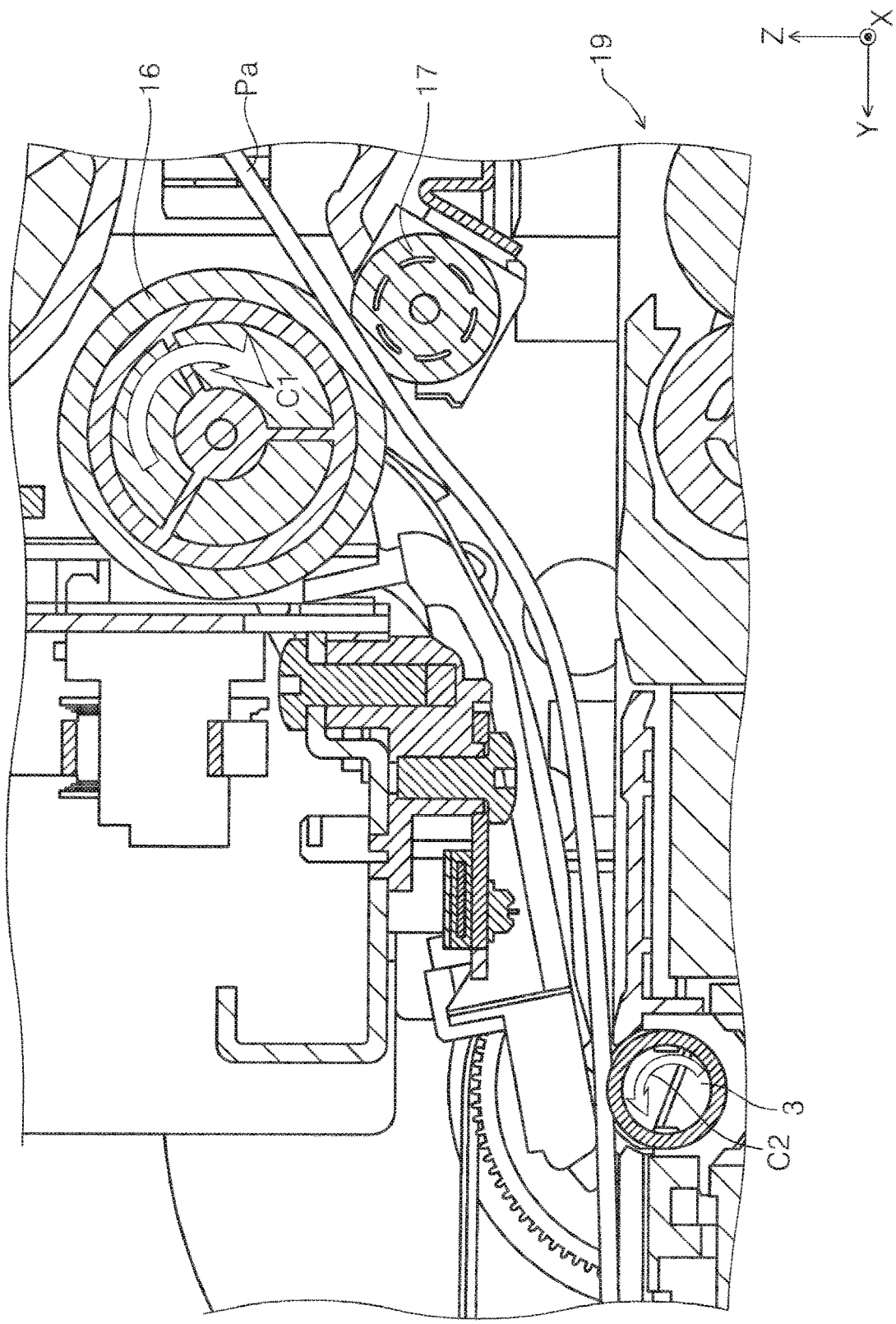
FIG. 8 is a perspective view illustrating a state in which the transport roller and the auxiliary roller of the recording apparatus according to the first embodiment of the present disclosure are forward rotated.
Figure 9:
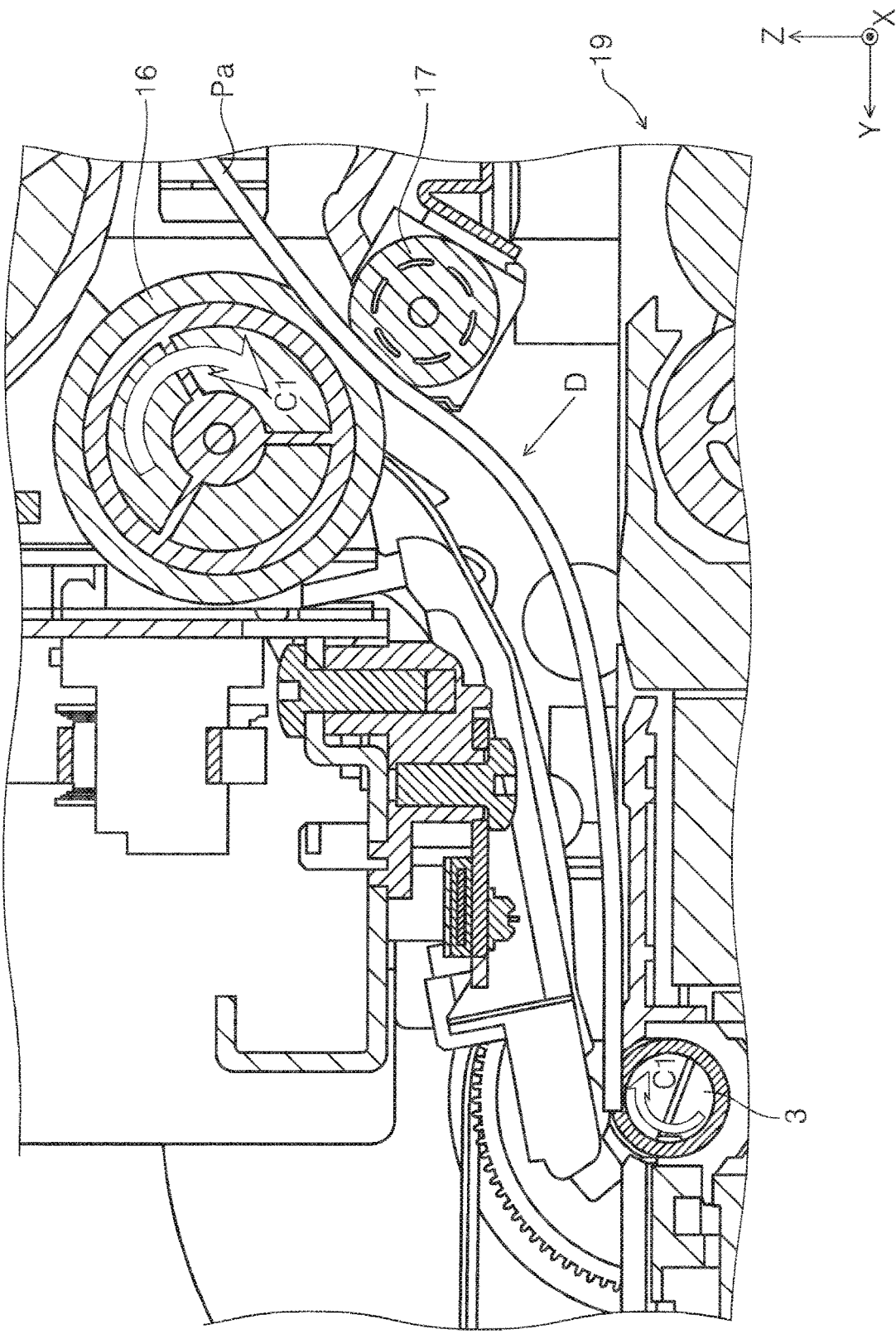
FIG. 9 is a perspective view illustrating a state in which the transport roller is reverse rotated and the auxiliary roller is forward rotated in the recording apparatus according to the first embodiment of the present disclosure.

The transport roller 3 can transport the medium in a direction opposite to the normal transport direction on the transport path R1 as a way of removing skew for suppressing skewed transport of the medium. Here, skew removal will be described with reference to FIGS. 8 and 9. FIG. 8 illustrates a state in which a cut sheet Pa serving as a medium is being transported in the normal transport direction on the transport path R1. On the other hand, FIG. 9 illustrates a state in which the cut sheet Pa is reverse-transported on the transport path R1 in a direction opposite to the normal transport direction from the state in FIG. 8. The transport roller 3, by repeating the transport of the medium in the normal transport direction illustrated in FIG. 8 and the reverse transport of the medium illustrated in FIG. 9, can suppress skewed transport of the medium by generating the deflection D as illustrated in FIG. 9.

As described above, the recording apparatus 1A has the drive trains 31 and 32 that transmit the drive of the motor 30 to the transport roller 3, the auxiliary roller 16, and the inverting roller 22, in detail, the recording apparatus 1A has the drive trains 31 and 32A, and the auxiliary roller 16 and the transport roller 3 are driven by the motor 30, which is shared, via the drive trains 31 and 32A. Therefore, the recording apparatus 1A can suppress variations in the rotational speed relationship of the auxiliary roller 16 and the transport roller 3 caused by the use of different motors, and can effectively suppress transport failure. In addition, by reducing the number of motors, the size of the apparatus can be reduced and the cost can be reduced.

In addition, as described above, the recording apparatus 1A includes a transport path R3 serving as an inverting path that inverts the medium, and the inverting roller 22 that is provided on the transport path R3 and that moves the medium by rotating in contact with the medium, and the auxiliary roller 16 and the inverting roller 22 are driven by the motor 30, which is shared. Since, by the recording apparatus 1A having an inverting path that inverts the medium, it is possible to record on both sides of the medium, and since, by driving the auxiliary roller 16 and the inverting roller 22 with the motor 30, which is shared, it is possible to particularly effectively suppress variations in the rotational speed relationship of the plurality of driving rollers that contribute to the transport of the medium, it is possible to particularly effectively suppress transport failure.

Here, as described above, the drive train 32A has the dual one-way clutch 55 between the transport roller 3 and the auxiliary roller 16 and between the transport roller 3 and the inverting roller 22. That is, in the recording apparatus 1A, the dual one-way clutch 55, which transmits the rotational force in one rotation direction among either the forward rotation direction or the reverse rotation direction regardless of whether the rotation shaft of the motor 30 rotates in the forward rotation direction or reverse rotation direction, is shared by the auxiliary roller 16 and the inverting roller 22. Therefore, in the recording apparatus 1A, it is possible to couple the transport roller 3, which requires rotation in the forward rotation direction and reverse rotation direction, and the auxiliary roller 16 and the inverting roller 22, which need only rotate in one of the forward rotation direction and the reverse rotation direction, via the drive train 32A, which is simple and has one dual one-way clutch 55. Therefore, the recording apparatus 1A can have a simplified apparatus configuration, and the size and cost of the apparatus can be reduced.

Figure 10:
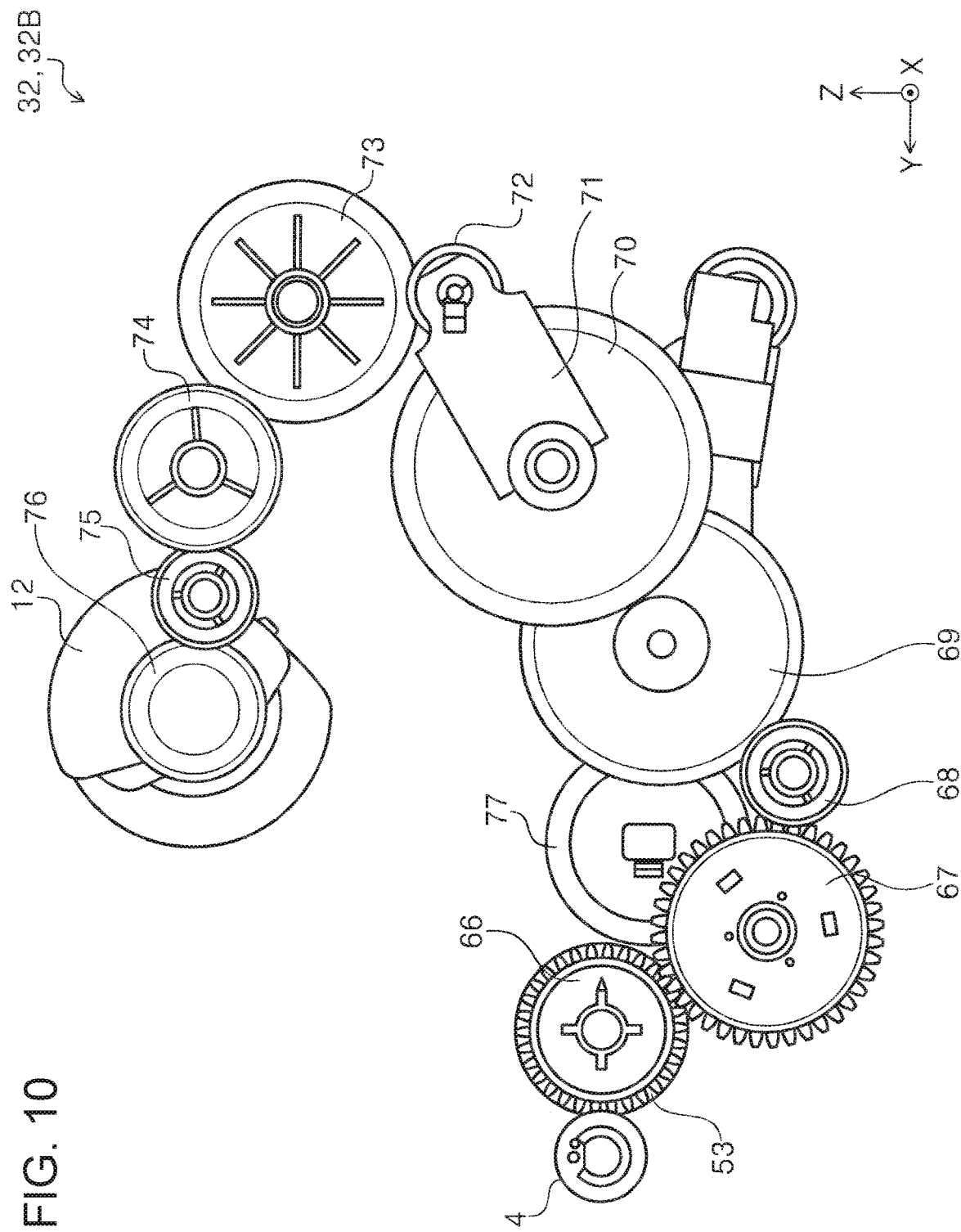
FIG. 10 is a perspective view illustrating a drive train from a transport roller to a feeding roller of the recording apparatus according to the first embodiment of the present disclosure.

FIG. 10 illustrates a drive train 32B within the drive train 32 from the transport roller 3 to the feeding roller 12. As illustrated in FIG. 10, the drive train 32B has the gear 4 attached to the transport roller 3, the compound gear 53 that meshes with the gear 4, a power switching gear 66 that is attached to the compound gear 53 and that shares a rotary shaft with the compound gear 53, and a single one-way clutch 67 that meshes with the power switching gear 66 when the power switching gear 66 is in the meshing position. The single one-way clutch 67 is a gear that rotates only in one rotation direction among the forward and reverse rotations regardless of whether the gear 54, which rotates in a forward or reverse direction upon forward rotation or reverse rotation of the transport roller 3, has rotated with forward rotation or reverse rotation.

The drive train 32B has a gear 68 that meshes with the single one-way clutch 67, a gear 69 that meshes with the gear 68, a gear 70 that meshes with the gear 69, a planetary unit 71 having one end attached to the rotary shaft of the gear 70 and a gear 72 at the other end, and, a gear 73 that meshes with the gear 72 when the planetary unit 71 is in the meshing position, a gear 74 that meshes with the gear 73, and a gear 75 that meshes with the gear 74. Furthermore, the drive train 32B has a roller shaft 37 (see FIG. 6) in which a gear 76 is provided on one side in the X-axis direction and the feeding roller 12 is provided on the other side in the X-axis direction. The gear 76 meshes with the gear 75.

Since the recording apparatus 1A has the drive train 32B having the above-described configuration that transmits the drive of the motor 30 to the feeding roller 12, the feeding roller 12 can be rotated by driving the motor 30. That is, in the recording apparatus 1A, the auxiliary roller 16 and the feeding roller 12 are driven by the motor 30, which is shared, via the drive trains 31 and 32B. As described above, in the recording apparatus 1A, since the auxiliary roller 16 and the feeding roller 12 are driven by the motor 30, which is shared, it is possible to particularly effectively suppress variation in the rotational speed relationship of the plurality of driving rollers that contribute to the transport of the medium, and it is possible to particularly effectively suppress transport failure.

As described above, the drive train 32B has the power switching gear 66 and the planetary unit 71. Therefore, by positioning the power switching gear 66 at a non-meshing position where it does not mesh with the single one-way clutch 67, or by positioning the planetary unit 71 at a non-meshing position where the gear 72 and the gear 73 do not mesh with each other, it is also possible to not transmit the rotational force of the transport roller 3 to the feeding roller 12.

Figure 11:
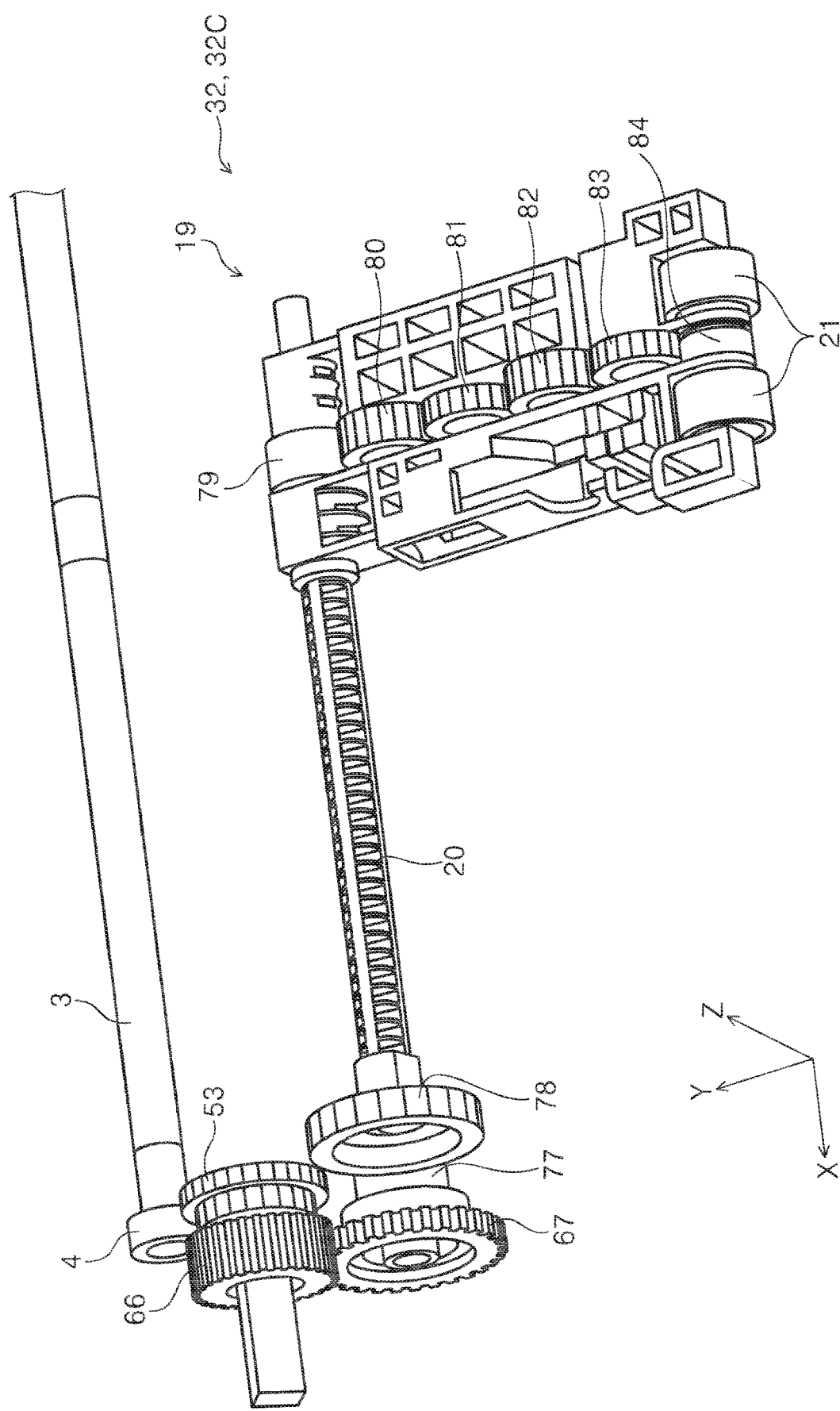
FIG. 11 is a perspective view illustrating the drive train from the transport roller to a pickup roller of the recording apparatus according to the first embodiment of the present disclosure.

FIG. 11 illustrates a drive train 32C within the drive train 32 from the transport roller 3 to the pickup roller 21. As illustrated in FIG. 11, the drive train 32C has the gear 4 attached to the transport roller 3, the compound gear 53 that meshes with the gear 4, the power switching gear 66 that is attached to the compound gear 53 and that shares a rotary shaft with the compound gear 53, and the single one-way clutch 67 that meshes with the power switching gear 66 when the power switching gear 66 is in the meshing position. The single one-way clutch 67 is provided with a gear 77 that shares a rotary shaft therewith, and by rotating the single one-way clutch 67, the gear 77 also rotates.

The drive train 32C has the pick unit rotary shaft 20 in which a gear 78 is provided on one side in the X-axis direction and a gear 79 is provided on the other side in the X-axis direction. The gear 78 meshes with the gear 77, and the gear 79 meshes with a gear 80 of the pick unit 19. The gear 80 meshes with a gear 81, the gear 81 meshes with a gear 82, the gear 82 meshes with a gear 83, and the gear 83 meshes with a gear 84 that is provided on the pickup roller 21 and that shares a rotary shaft with the pickup roller 21.

Since the recording apparatus 1A has the drive train 32C having the above-described configuration that transmits the drive of the motor 30 to the pickup roller 21, the pickup roller 21 can be rotated by driving the motor 30. That is, the recording apparatus 1A has, as a feeding roller, in addition to the feeding roller 12 as a rear feeding roller that feeds out a medium that has been set on the rear side of the recording head 2 in the discharge direction of the medium, the pickup roller 21 as a front feeding roller that feeds out a medium that has been set on a line extending from the facing position P1 with respect to the recording head 2. The auxiliary roller 16 and the pickup roller 21 are driven by the motor 30, which is shared, via the drive trains 31 and 32C. With such a configuration, since the recording apparatus 1A can feed out the medium from a preferable side among the feeding roller 12 side and the pickup roller 21 side according to the type of medium used and the like, and the auxiliary roller 16 and the pickup roller 21 are driven by the motor 30, which is shared, it is possible to particularly effectively suppress variations in the rotational speed relationship of the plurality of driving rollers that contribute to the transport of the medium, and it is possible to particularly effectively suppress transport failure.

As described above, the drive train 32C has the power switching gear 66. Therefore, it is possible to suppress the rotational force of the transport roller 3 from being transmitted to the pickup roller 21 by positioning the power switching gear 66 at a non-meshing position where it does not mesh with the single one-way clutch 67.

Here, as described above, by driving the motor 30, the rotational force of the motor 30 is transmitted to the transport roller 3 via the drive train 31. As illustrated in FIG. 12, the drive train 31 includes the gear 50 attached to the transport roller 3, the gear 52 attached to the discharging roller 15, and the belt 51 that bridges the gear 50 and the gear 52. With such a configuration, the drive train 31, when the motor 30 is driven, can rotate the transport roller 3 and drive the discharging roller 15. As represented by the drive train 31, the "drive train" in the present specification is not limited to one formed by only gears, and may include, other than gears, a component such as a belt.

As described above, the recording apparatus 1A has the drive trains 31 and 32A that transmit the drive of the motor 30 to the transport roller 3, the auxiliary roller 16 and the discharging roller 15, and the auxiliary roller 16 and the discharging roller 15 are driven by the motor 30, which is shared, via the drive trains 31 and 32A. Therefore, it is possible to suppress variations in the rotational speed relationship between the auxiliary roller 16 and the discharging roller 15 due to the use of different motors, and it is possible to effectively suppress transport failure. In addition, by reducing the number of motors, the apparatus can be reduced in size and the cost can be reduced. In particular, as in this embodiment, because, in addition to the auxiliary roller 16 and the discharging roller 15, the transport roller 3 is also driven by the motor 30, which is shared, it is possible to particularly effectively suppress variations in the rotational speed relationship of the plurality of driving rollers that contribute to the transport of the medium, and it is possible to particularly effectively suppress transport failure.

Here, a preferable driving method of the auxiliary roller 16 will be described, and it is preferable that the auxiliary roller 16 is intermittently driven when the medium is transported. Frictional force between the auxiliary roller 16 and the medium is larger when the operation of feeding out the stopped medium is repeated since a static friction coefficient is larger than a dynamic friction coefficient. Therefore, by intermittently driving the auxiliary roller 16, transport failure can be effectively suppressed.

In addition, it is preferable to drive the auxiliary roller 16 so as to rotate as quickly as possible when the medium is transported. This is because the frictional force between the auxiliary roller 16 and the medium increases when the auxiliary roller 16 rotates quickly, and transport failure can be effectively suppressed by rotating the auxiliary roller 16 quickly. Specifically, it is preferable that the auxiliary roller 16 is driven so as to rotate as quickly as possible after satisfying the conditions that the sound generated by driving the auxiliary roller 16 is within an allowable range, that media are not fed in duplicate due to excessive frictional force, and the like. As described above, in this embodiment, all three of the three driving rollers of the feeding roller 12, the auxiliary roller 16 and the transport roller 3 or the two driving rollers of the auxiliary roller 16 and the transport roller 3 can be used to transport the medium; however, it is also possible to perform control so that the rotational speed of the auxiliary roller 16 when the medium is transported using the two driving rollers of the auxiliary roller 16 and the transport roller 3 is higher than that when the medium is transported using the three driving rollers of the feeding roller 12, the auxiliary roller 16, and the transport roller 3. Further, even when the auxiliary roller 16 is driven so as to rotate as quickly as possible when the medium is transported, the relationship among the medium transport speed by the feeding roller 12 alone, the medium transport speed by the auxiliary roller 16 alone, the medium transport speed by the transport roller 3 alone, and the medium transport speed by the discharging roller 15 alone is preferably not changed.

Figure 13:
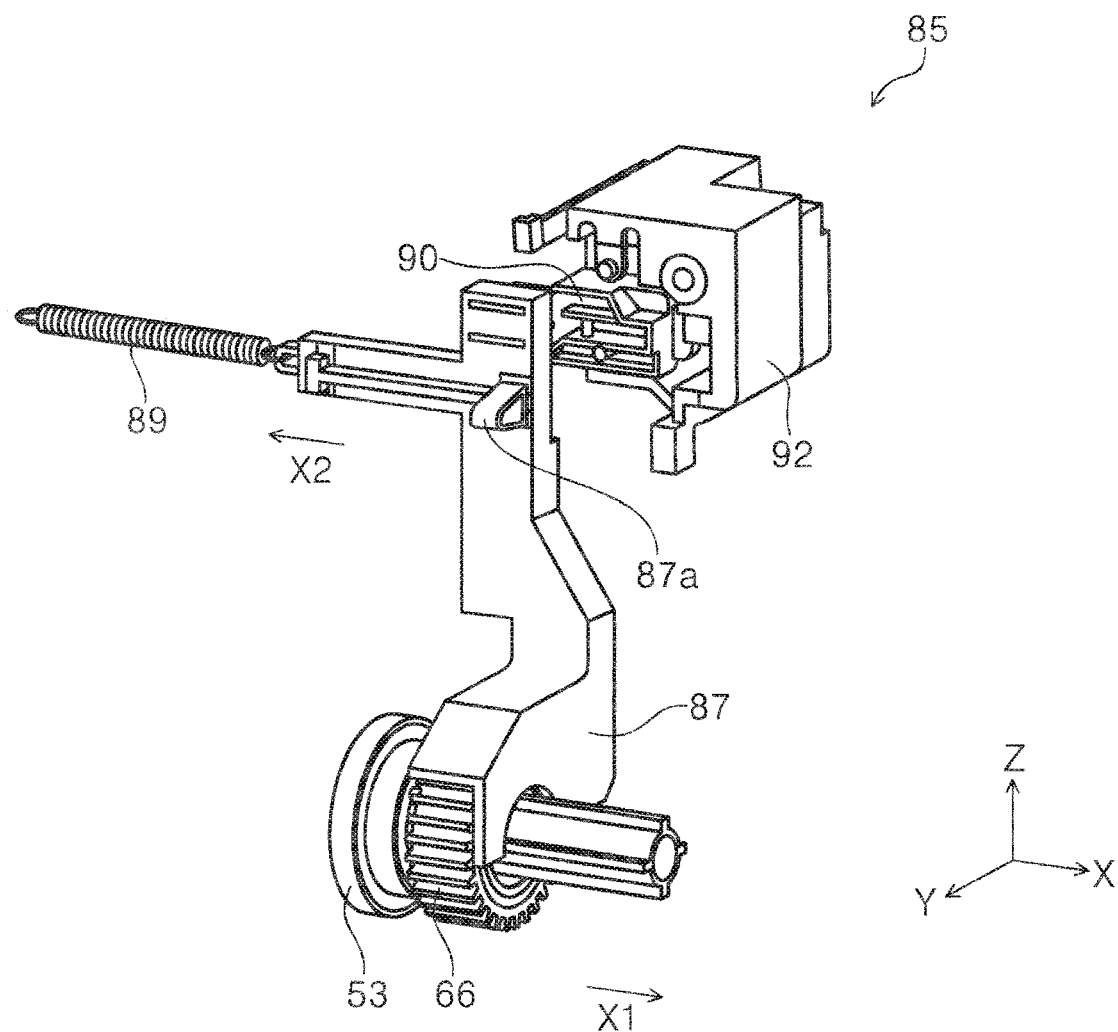
FIG. 13 is a perspective view illustrating the power switching mechanism of the recording apparatus according to the first embodiment of the present disclosure, and illustrating a state in which the respective constituent members are combined.
Figure 14:
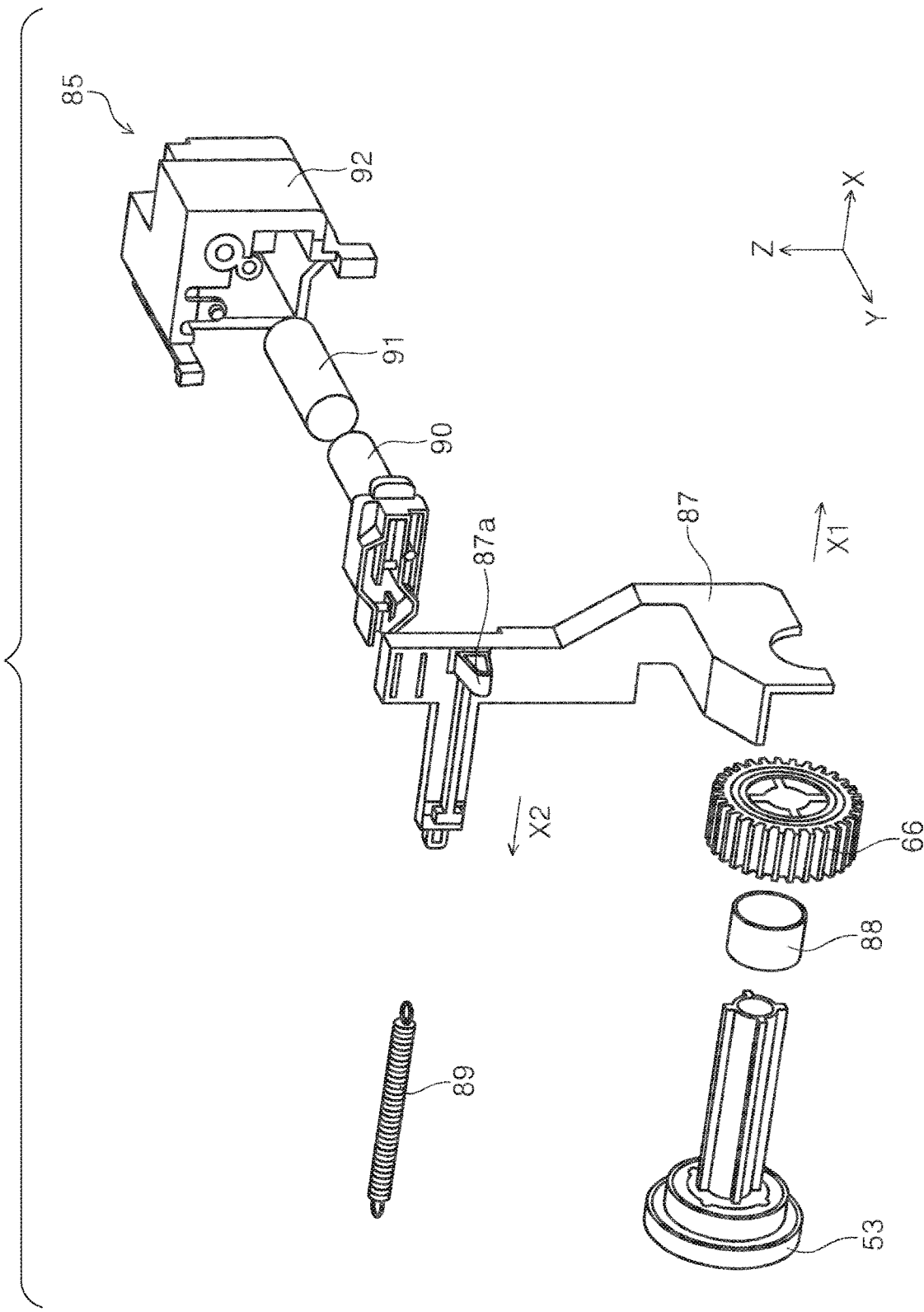
FIG. 14 is a perspective view illustrating the power switching mechanism of the recording apparatus according to the first embodiment of the present disclosure, and illustrating a state in which the respective constituent members are disassembled.

Next, switching of the power switching gear 66 by a power switching mechanism 85 will be described with reference to FIGS. 13 to 16. By providing the power switching mechanism 85, it is possible to make the feeding roller 12 and the pickup roller 21 not rotate while the transport roller 3 is rotating. Further, the auxiliary roller 16, the inverting roller 22, and the discharging roller 15 always rotate with rotation of the transport roller 3. As illustrated in FIGS. 13 and 14, the power switching mechanism 85 includes the compound gear 53, the power switching gear 66 having a rotary shaft shared by the compound gear 53, a switching lever 87, a switching cam 90, and a housing 92. Among these, the positions of the compound gear 53 and the housing 92 are immovable inside the recording apparatus 1A.

As illustrated in FIG. 14, a spring 88 is provided between the compound gear 53 and the power switching gear 66, and the power switching gear 66 is pressed by the spring 88 toward the switching lever 87 along the X-axis direction. The pressing direction of the power switching gear 66 is the X1 direction. The switching lever 87 is pulled by a spring 89 in the X2 direction, which is a direction along the X-axis direction and opposite to the X1 direction. The switching cam 90 serves as a positioning unit that determines the position of the switching lever 87 in the X-axis direction.

Figure 15:
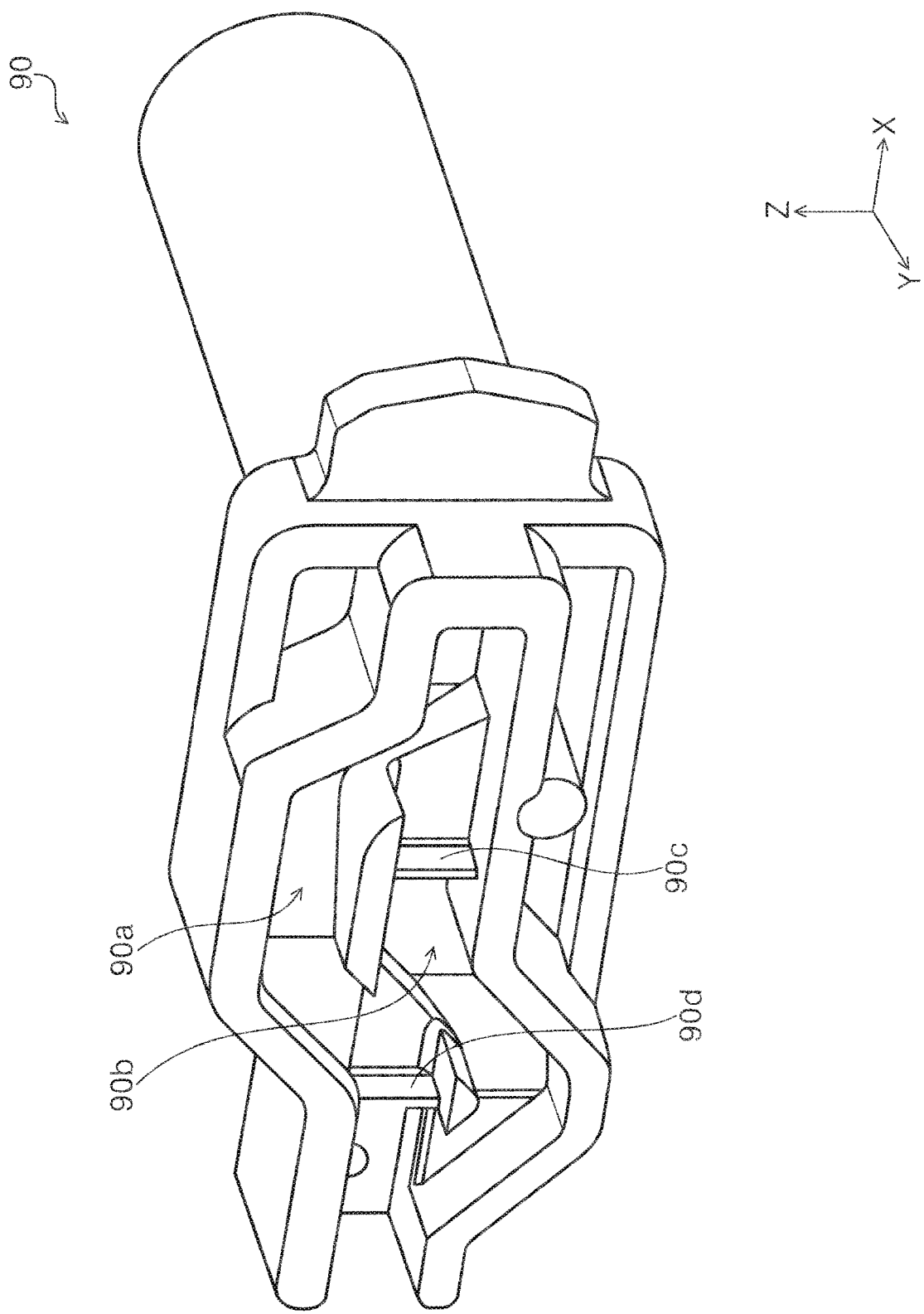
FIG. 15 is a perspective view illustrating a switching cam of the power switching mechanism of the recording apparatus according to the first embodiment of the present disclosure.
Figure 16:
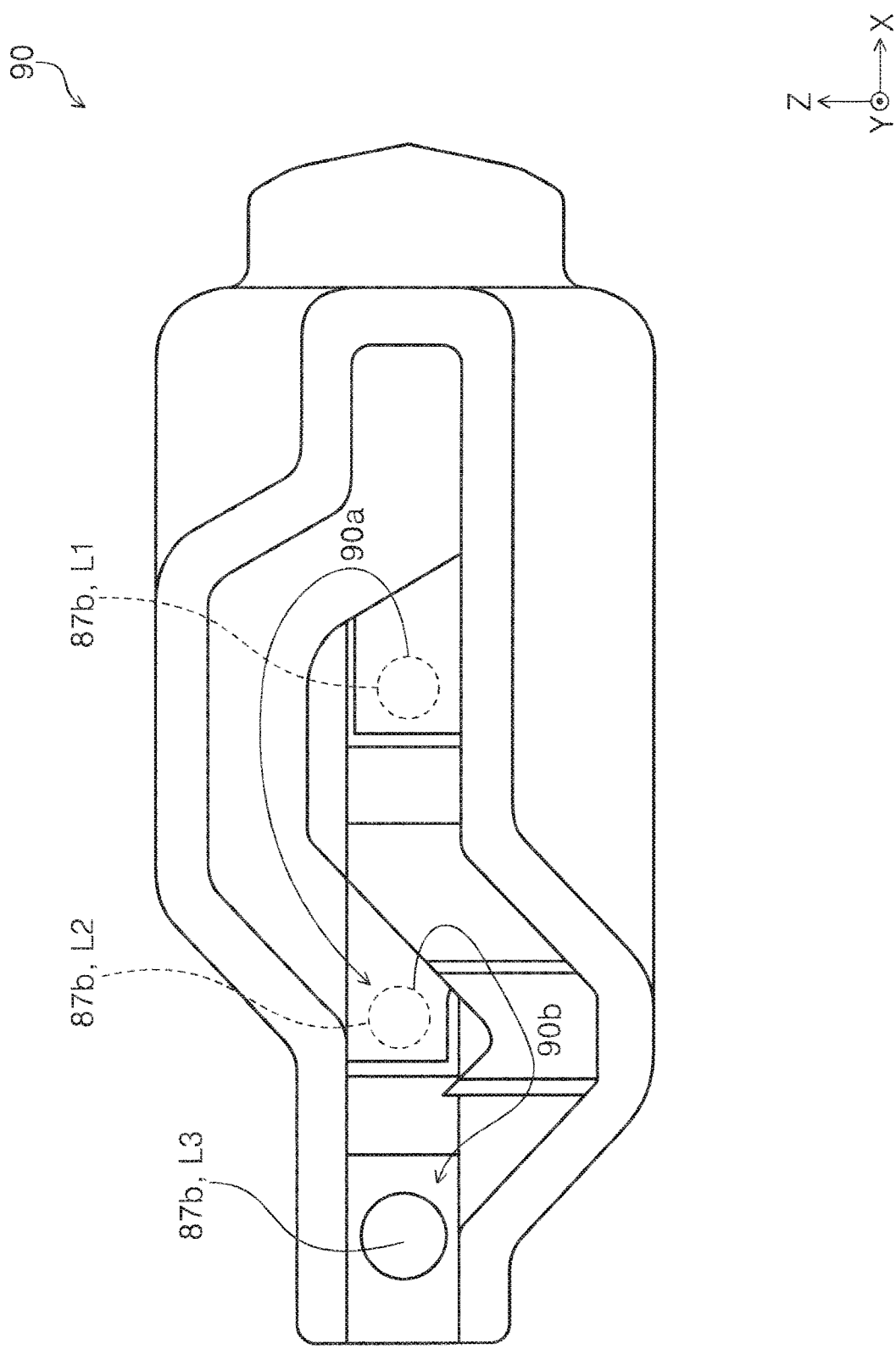
FIG. 16 is a front view illustrating the switching cam of the power switching mechanism of the recording apparatus according to the first embodiment of the present disclosure.

As illustrated in FIG. 14, the switching cam 90 is attached to the housing 92 with a spring 91 interposed therebetween and is movable in the Y-axis direction. The switching cam 90 is configured to allow a protruding portion 87b of the switching lever 87 to change between the positions L1, L2, and L3, which are hooking positions for the protruding portion 87b, by moving along the Y-axis direction. As illustrated in FIGS. 15 and 16, the switching cam 90 has movement paths 90a and 90b for the protruding portion 87b and hooking portions 90c and 90d for the protruding portion 87b. The position where the protruding portion 87b is hooked on the hook 90c corresponds to the location L1, the position where the protruding portion 87b is hooked on the hook 90d corresponds to the location L2, the position where the protruding portion 87b is not hooked on the hooking portions 90c and 90d corresponds to the location L3.

As illustrated in FIGS. 13 and 14, the switching lever 87 is provided with an arm 87a that comes into contact with the carriage 27 with reciprocation of the carriage 27 along the X-axis direction. Since the switching lever 87 is pulled in the X2 direction, when the carriage 27 comes into contact with the arm 87a when the protruding portion 87b is located at the location L1, the protruding portion 87b moves to the location L2 along the movement path 90a. In addition, when the carriage 27 comes into contact with the arm 87a when the protruding portion 87b is located at the location L2, the protruding portion 87b moves to the location L3 along the movement path 90b. Furthermore, when the carriage 27 comes into contact with the arm 87a when the protruding portion 87b is located at the location L3, when the carriage 27 pushes the arm 87a in the X1 direction, the protruding portion 87b moves to the location L1 while the switching cam 90 is pushed toward the housing 92 along the Y-axis direction.

Since, the position of the switching lever 87 in the X-axis direction changes when the protruding portion 87b changes between the locations L1, L2, and L3 as described above, the position of the power switching gear 66 pressed toward the switching lever 87 also changes in the X-axis direction. The position of the power switching gear 66 with respect to the single one-way clutch 67 changes when the position of the power switching gear 66 in the X-axis direction changes. That is, with the above configuration, the power switching gear 66 changes position between a meshing position and a non-meshing position with respect to the single one-way clutch 67. Further, when the protruding portion 87*b* is located at the location L1, only an ink system unit (not illustrated) is driven with driving of the motor 30 and the feeding roller 12 and the pickup roller 21 are not driven. In addition, when the protruding portion 87*b* is located at the location L2, none of the ink system unit, the feeding roller 12 and the pickup roller 21 are driven with driving of the motor 30. When the protruding portion 87*b* is located at the location L3, the feeding roller 12 and the pickup roller 21 are driven with driving of the motor 30, and the ink system unit is not driven.

Second Embodiment

Next, a recording apparatus 1B of Example 2 will be described with reference to FIGS. 17 to 19. Further, in FIGS. 17 to 19, components common to those in the first embodiment are denoted by the same reference signs, and detailed description thereof will be omitted. Here, the recording apparatus 1B of this embodiment has the same features as the recording apparatus 1A of the first embodiment described above, and except for the points described below, it has the same shape as the recording apparatus 1A of the first embodiment.

In the recording apparatus 1B, the arrangement of the auxiliary roller 16 and the driven roller 17 in the pair of rollers 18, which are driving rollers, is opposite to that of the recording apparatus 1A. In other words, the upper roller of the pair of rollers 18 is the driven roller 17, and the lower roller of the pair of rollers 18 is the auxiliary roller 16. A driven roller 93 is further provided below the auxiliary roller 16, which is the lower roller, the auxiliary roller 16 and the driven roller 17 form the pair of rollers 18, and, the auxiliary roller 16 and the driven roller 93 form a pair of rollers 94.

Figure 17:
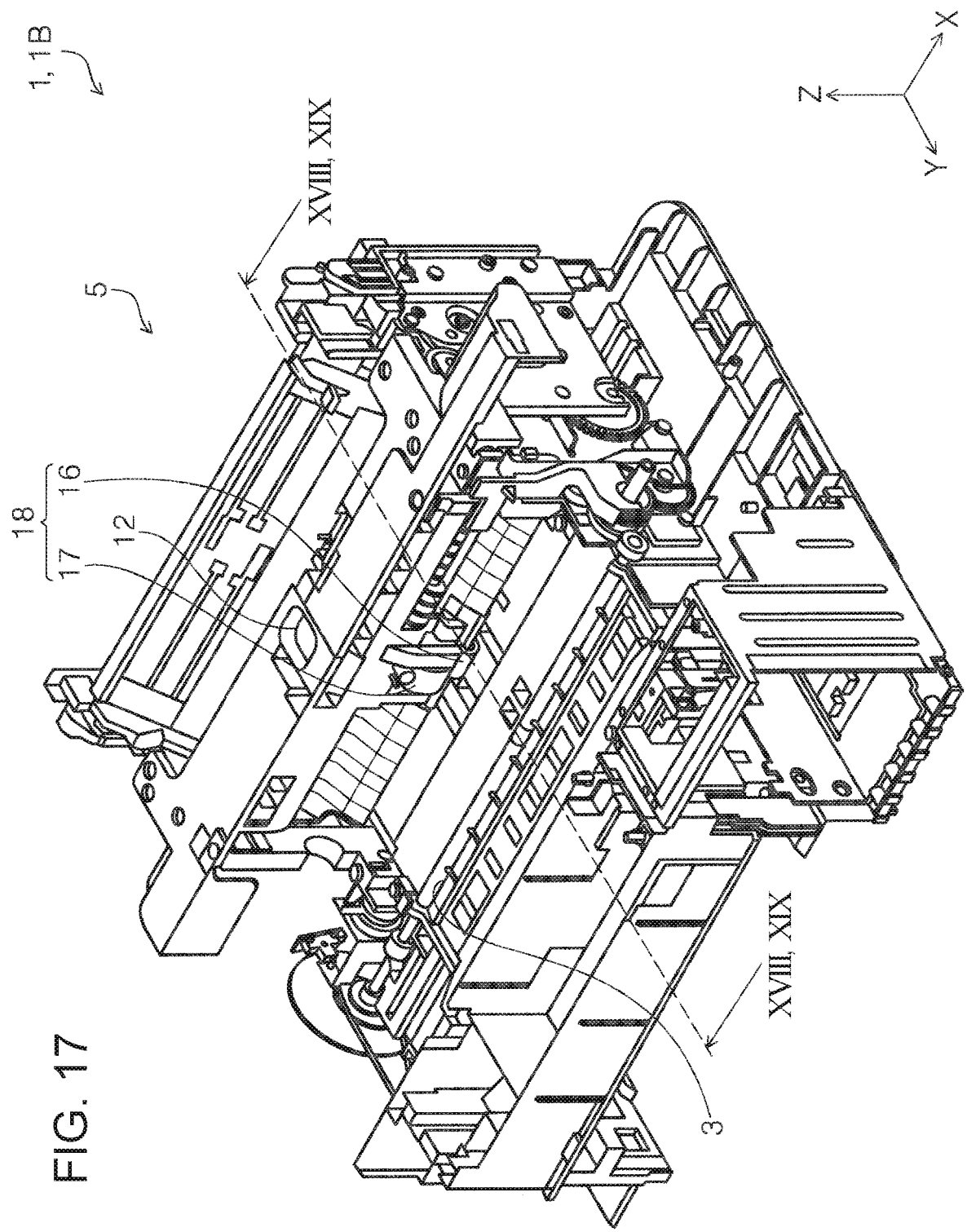
FIG. 17 is a perspective view illustrating an internal configuration of a recording apparatus according to a second embodiment of the present disclosure.
Figure 18:
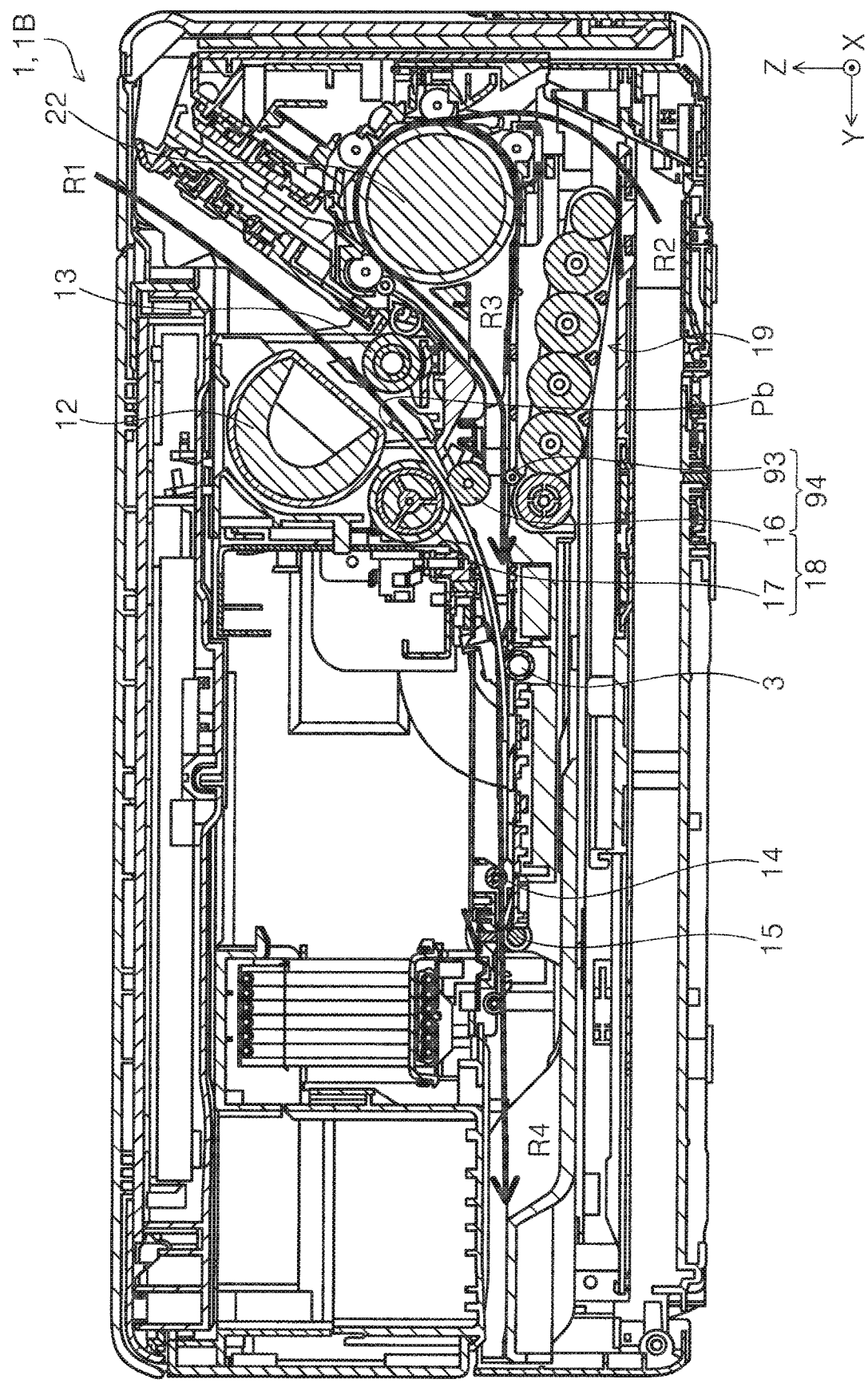
FIG. 18 is a sectional view of the recording apparatus taken along the line XVIII, XIX-XVIII, XIX in FIG. 17, and illustrates a state in which the auxiliary roller is in a position where it does not nip the medium on an inverting path.
Figure 19:
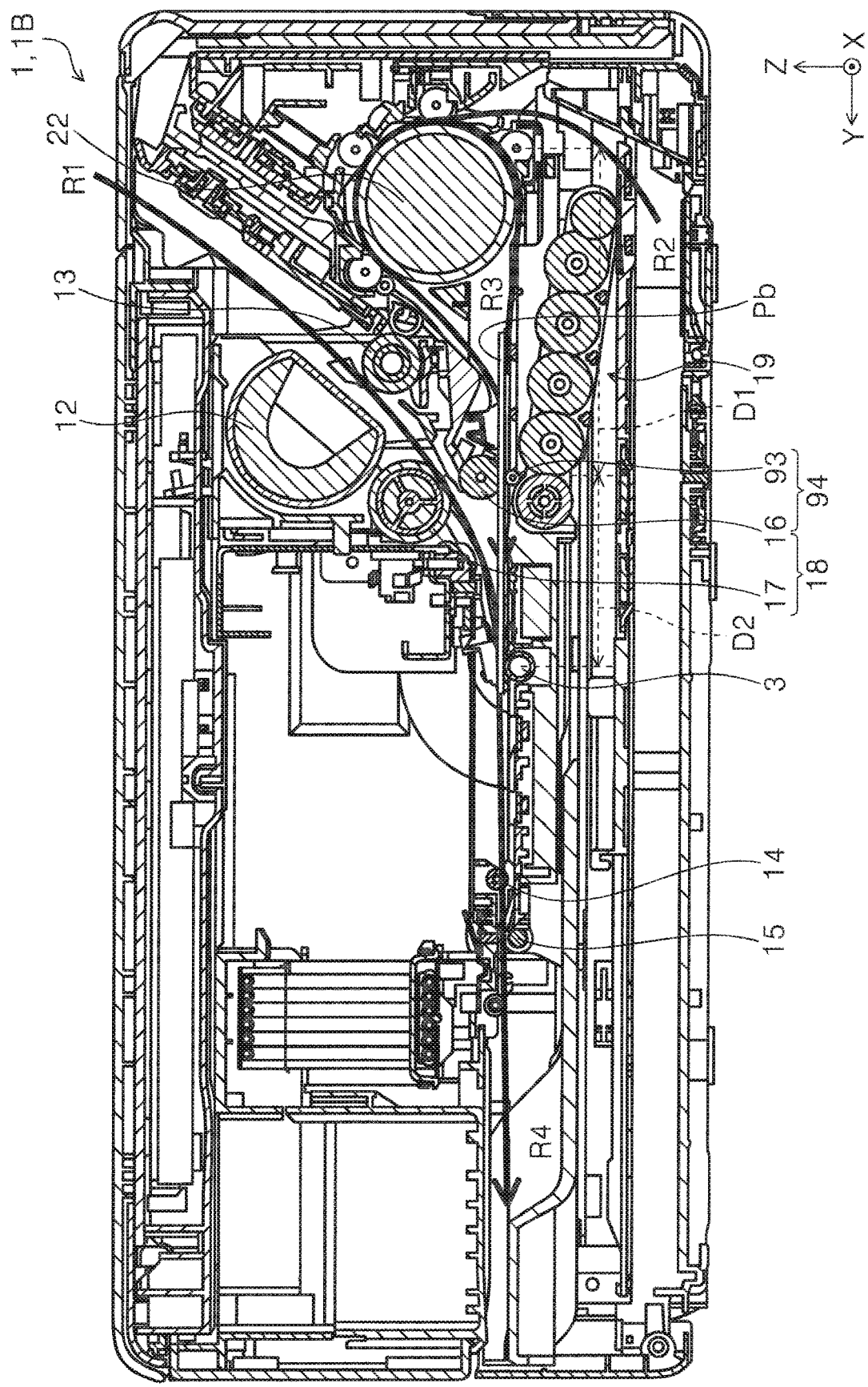
FIG. 19 is a sectional view of the recording apparatus taken along the line XVIII, XIX-XVIII, XIX in FIG. 17, illustrating a state in which the auxiliary roller is in a position of holding the medium in the inverting path.

FIG. 17 illustrates what portions of the recording unit 5 of the recording apparatus 1B are viewed from what directions in FIGS. 18 and 19. FIGS. 18 and 19 are sectional views taken along the line XVIII, XIX-XVIII, XIX in FIG. 17 viewed from the same angle. FIG. 18 illustrates a state where a business card Pb, which is a medium, is nipped by the pair of rollers 18 and transported. In addition, FIG. 19 illustrates a state in which the business card Pb is nipped by the pair of rollers 94 and is transported rearward to the inverting roller 22.

In the recording apparatus 1B, the distance D1 from the pair of rollers 94 to the nip position of the driven roller 23 and the inverting roller 22 is shorter than the length of the business card Pb in the transport direction. In addition, the distance from the pair of rollers 94 to the nip position of the transport roller 3 is shorter than that of the business card Pb. Since the recording apparatus 1B is provided with the driven roller 93 at such a position, it is configured to transport even short business cards.

In addition, as described above, in the recording apparatus 1B, the auxiliary roller 16 that assists in transport along the transport path R1 is a lower roller, and the auxiliary roller 16 can be used as an auxiliary roller that assists in transport along the transport path R3. With such a configuration, even when a small medium such as a business card Pb is used, it is possible to maintain high transport accuracy on the transport path R2 and the transport path R3 (see FIG. 5). In particular, when a small medium such as a business card Pb is used, it is possible to record on both sides with high transport accuracy. Further, when a small medium such as a business card Pb is used, the medium can be transported not only from the feed tray 9 side but also from the cassette 11 side.

Further, the present disclosure is not limited to the above embodiments, and various modifications can be made within the scope of the present disclosure described in the claims, and it goes without saying that they are also included in the scope of the present disclosure.

What is claimed is:

1. A recording apparatus comprising:
a recording head that performs recording;
a feeding roller that feeds out a medium that was set on a feed tray;
a transport roller that transports the medium fed out by the feeding roller toward a facing position facing the recording head, wherein the transport roller is upstream of the recording head in the transport direction of the medium;
an auxiliary roller that is provided between the feeding roller and the transport roller and that assists in the transport of the medium;
a motor that generates driving force;
a drive train that is configured to transmit the driving force of the motor to the auxiliary roller and the transport roller;
an inverting path that inverts the medium; and
an inverting roller that is provided on the inverting path and that moves the medium by rotating in contact with the medium, wherein
the drive train is configured to transmit the driving force of the motor to the inverting roller; and
the auxiliary roller and the inverting roller are both driven by directly receiving the driving force of the motor via the drive train.

2. The recording apparatus according to claim 1, wherein
the drive train is configured to transmit the driving force of the motor to the feeding roller, and
the feeding roller and the transport roller are driven by the motor via the drive train.

3. The recording apparatus according to claim 2, further comprising:
a medium cassette configured to place a second medium therein; and
a front feeding roller that feeds out the second medium from the medium cassette toward the facing position facing the recording head, wherein
the feeding roller is a rear feeding roller that feeds out the medium from the feed tray toward the facing position facing the recording head,
the drive train is configured to transmit the driving force of the motor to the front feeding roller, and
the rear feeding roller and the front feeding roller are driven by the motor via the drive train.

4. The recording apparatus according to claim 1, further comprising:
a medium cassette configured to place a second medium therein; and
a front feeding roller that feeds out the second medium from the medium cassette toward the facing position facing the recording head, wherein the feeding roller is a rear feeding roller that feeds out the medium from the feed tray toward the facing position facing the recording head, the drive train is configured to transmit the driving force of the motor to the front feeding roller, and the front feeding roller and the transport roller are driven by the motor via the drive train.

5. The recording apparatus according to claim 1, wherein the drive train has a clutch that transmits rotational force in either a forward rotation direction or a reverse rotation direction regardless of whether a rotation shaft of the motor rotates in the forward rotation direction or the reverse rotation direction.

6. A recording apparatus comprising:
a recording head that performs recording;
a feeding roller that feeds out a medium that was set on a feed tray;
a transport roller that transports the medium fed out by the feeding roller toward a facing position facing the recording head, wherein the transport roller is upstream of the recording head in the transport direction of the medium;
a discharging roller that discharges the medium that was recorded on by the recording head at the facing position;
an auxiliary roller that is provided between the feeding roller and the transport roller and that assists in the transport of the medium;
a motor that generates driving force;
a drive train that is configured to transmit the driving force of the motor to the auxiliary roller and the discharging roller;
an inverting path that inverts the medium; and
an inverting roller that is provided on the inverting path and that moves the medium by rotating in contact with the medium, wherein
the drive train is configured to transmit the driving force of the motor to the inverting roller; and
the auxiliary roller, the inverting roller, and the discharging roller are all driven by directly receiving the driving force of the motor via the drive train.

7. The recording apparatus according to claim 6, wherein
the drive train is configured to transmit the driving force of the motor to the transport roller; and
the transport roller is driven by the motor via the drive train.

8. The recording apparatus according to claim 7, wherein
the drive train is configured to transmit the driving force of the motor to the feeding roller, and
the transport roller, and the feeding roller are driven by the motor via the drive train.

9. The recording apparatus according to claim 8, further comprising:
a medium cassette configured to place a second medium therein; and
a front feeding roller that feeds out the second medium from the medium cassette toward the facing position facing the recording head, wherein
the feeding roller is a rear feeding roller that feeds out the medium from the feed tray toward the facing position facing the recording head, the drive train is configured to transmit the driving force of the motor to the front feeding roller, and the transport roller, the rear feeding roller, and the front feeding roller are driven by the motor via the drive train.

10. The recording apparatus according to claim 7, further comprising:
a medium cassette configured to place a second medium therein; and
a front feeding roller that feeds out the second medium from the medium cassette toward the facing position facing the recording head, wherein
the feeding roller is a rear feeding roller that feeds out the medium from the feed tray toward the facing position facing the recording head, the drive train is configured to transmit the driving force of the motor to the front feeding roller, and the rear feeding roller is driven by the motor via the drive train.

11. The recording apparatus according to claim 6, wherein
the drive train is configured to transmit the driving force of the motor to the feeding roller, and
the feeding roller is driven by the motor via the drive train.

12. The recording apparatus according to claim 11, further comprising:
a medium cassette configured to place a second medium therein; and
a front feeding roller that feeds out the second medium from the medium cassette toward the facing position facing the recording head, wherein
the feeding roller is a rear feeding roller that feeds out the medium from the feed tray toward the facing position facing the recording head, the drive train is configured to transmit the driving force of the motor to the front feeding roller, and the front feeding roller and the rear feeding roller are driven by the motor via the drive train.

13. The recording apparatus according to claim 6, further comprising:
a medium cassette configured to place a second medium therein; and
a front feeding roller that feeds out the second medium from the medium cassette toward the facing position facing the recording head, wherein
the feeding roller is a rear feeding roller that feeds out the medium from the feed tray toward the facing position facing the recording head, the drive train is configured to transmit the driving force of the motor to the front feeding roller, and the front feeding roller is driven by the motor via the drive train.

14. The recording apparatus according to claim 6, wherein
the drive train has a clutch that transmits rotational force in either a forward rotation direction or a reverse rotation direction regardless of whether a rotation shaft of the motor rotates in the forward rotation direction or the reverse rotation direction.

* * * * *